US008806276B2

(12) United States Patent
Fukumura

(10) Patent No.: US 8,806,276 B2
(45) Date of Patent: Aug. 12, 2014

(54) CONTROL SYSTEM FOR DRIVING A DATA PROCESSING APPARATUS

(75) Inventor: Hiromi Fukumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 164 days.

(21) Appl. No.: 12/926,669

(22) Filed: Dec. 2, 2010

(65) Prior Publication Data

US 2011/0173494 A1    Jul. 14, 2011

Related U.S. Application Data

(63) Continuation of application No. PCT/JP2008/060166, filed on Jun. 2, 2008.

(51) Int. Cl.
*G06F 11/00* (2006.01)

(52) U.S. Cl.
USPC .................................. 714/25; 714/13; 714/15

(58) Field of Classification Search
USPC .............................................................. 714/25
See application file for complete search history.

(56) References Cited

U.S. PATENT DOCUMENTS

| 6,085,334 | A * | 7/2000 | Giles et al. .................... 714/6.32 |
| 6,910,108 | B2 * | 6/2005 | Downer et al. ................ 711/141 |
| 7,024,510 | B2 * | 4/2006 | Olarig ........................... 710/311 |
| 7,343,515 | B1 | 3/2008 | Gilbertson et al. |
| 7,743,375 | B2 * | 6/2010 | Goodman et al. ................. 718/1 |
| 7,752,378 | B2 * | 7/2010 | Fukumura et al. ............. 710/317 |
| 8,230,258 | B2 * | 7/2012 | Yamagami ....................... 714/15 |
| 2002/0186711 | A1 * | 12/2002 | Masuyama et al. ............ 370/468 |
| 2004/0153888 | A1 | 8/2004 | Kadoi |
| 2004/0210800 | A1 | 10/2004 | Ghislain Gabriel Vecoven et al. |
| 2005/0081126 | A1 | 4/2005 | Kulkarni et al. |
| 2006/0212749 | A1 | 9/2006 | Kawahara et al. |
| 2008/0276222 | A1 * | 11/2008 | Yamagami ..................... 717/124 |
| 2008/0320272 | A1 * | 12/2008 | Fukumura et al. .............. 712/13 |
| 2010/0083252 | A1 * | 4/2010 | Eide et al. ..................... 718/100 |

FOREIGN PATENT DOCUMENTS

| JP | 2001-134546 | 5/2001 |
| JP | 2002-229811 | 8/2002 |
| JP | 2003-076671 | 3/2003 |
| JP | 2004-062535 | 2/2004 |
| JP | 2006-031199 | 2/2006 |
| JP | 2006-260325 | 9/2006 |

OTHER PUBLICATIONS

International Search Report for corresponding International Application PCT/JP2008/060166; mailed Aug. 12, 2008.
Extended European Search Report dated May 23, 2012 issued in corresponding European Patent Application No. 08764979.4.

* cited by examiner

*Primary Examiner* — Kamini Patel
(74) *Attorney, Agent, or Firm* — Staas & Halsey LLP

(57) ABSTRACT

A data processing system for performing stuck-at control includes system boards that process data, a crossbar unit having control units to control communication between each system board, and a system controller without causing an availability ratio of a computer system to fall. When a control unit fails, the crossbar unit sends, among IDs uniquely attached to each system board, the ID of each system board under the control of the failed control unit to the system controller. The system controller determines to which of partitions that logically divide a system each system board corresponding to the ID received from the crossbar unit belongs and sends a stop command to stop driving of each system board belonging to the determined partition.

3 Claims, 26 Drawing Sheets

| | SB0 | SB1 | SB2 | SB3 | SB4 | SBn | SBn+1 | SBn+2 | SBn+3 | SBn+4 |
|---|---|---|---|---|---|---|---|---|---|---|
| PID | 1 | 1 | 2 | 2 | 3 | 2 | 3 | 3 | 4 | 4 |
| VAL | 0 | 0 | 0 | 0 | 0 | 0 | 0 | 0 | 0 | 0 |

FIG.12

|  | SB0 | SB1 | SB2 | SB3 | SB4 | SB5 |
|---|---|---|---|---|---|---|
| PID | 1 | 1 | 2 | 2 | 3 | 3 |
| VAL | 0 | 0 | 0 | 0 | 0 | 0 |

FIG.13

| SAME PARTITION DETERMINATION | RE-SULT | PARTITION DETERMINATION USED FOR BUS BETWEEN XB (ERR_ENB SIGNAL OF 2ND CONTROL UNIT) | RE-SULT | PARTITION DETERMINATION USING 1ST CONTROL UNIT OR 2ND CONTROL UNIT IN COMMON (ERR_ENB SIGNAL OF 1ST CONTROL UNIT) | RE-SULT |
|---|---|---|---|---|---|
| SB0_ID == SB00_ID_MCH<br>SB0_ID == SB01_ID_MCH<br>SB0_ID == SB02_ID_MCH | 1(A-1)<br>1<br>0(A-2) | | | SB00_ID_MCH+(XB1_ERR_ENB[0]·XB1_ERR_ENB[0]) ⇒ SB0_ERR_ENB[0]<br>SB01_ID_MCH+(XB1_ERR_ENB[0]·XB1_ERR_ENB[1]) ⇒ SB0_ERR_ENB[1]<br>SB02_ID_MCH+(XB1_ERR_ENB[0]·XB1_ERR_ENB[2]) ⇒ SB0_ERR_ENB[2] | 1(C-1)<br>1<br>0(C-2) |
| SB0_ID == SB03_ID_MCH<br>SB0_ID == SB04_ID_MCH<br>SB0_ID == SB05_ID_MCH | 0<br>0<br>0 | ↑ or ↓ ⇒ XB1_ERR_ENB[0] | 0<br>(B-1) | | |
| SB1_ID == SB10_ID_MCH<br>SB1_ID == SB11_ID_MCH<br>SB1_ID == SB12_ID_MCH | 1<br>1<br>0 | | | SB10_ID_MCH+(XB1_ERR_ENB[1]·XB1_ERR_ENB[0]) ⇒ SB0_ERR_ENB[0]<br>SB11_ID_MCH+(XB1_ERR_ENB[1]·XB1_ERR_ENB[1]) ⇒ SB0_ERR_ENB[1]<br>SB12_ID_MCH+(XB1_ERR_ENB[1]·XB1_ERR_ENB[2]) ⇒ SB0_ERR_ENB[2] | 1<br>1<br>0 |
| SB1_ID == SB13_ID_MCH<br>SB1_ID == SB14_ID_MCH<br>SB1_ID == SB15_ID_MCH | 0<br>0<br>0 | ↑ or ↓ ⇒ XB1_ERR_ENB[1] | 0 | | |
| SB2_ID == SB20_ID_MCH<br>SB2_ID == SB21_ID_MCH<br>SB2_ID == SB22_ID_MCH | 0<br>0<br>1 | | | SB20_ID_MCH+(XB1_ERR_ENB[2]·XB1_ERR_ENB[0]) ⇒ SB0_ERR_ENB[0]<br>SB21_ID_MCH+(XB1_ERR_ENB[2]·XB1_ERR_ENB[1]) ⇒ SB0_ERR_ENB[1]<br>SB22_ID_MCH+(XB1_ERR_ENB[2]·XB1_ERR_ENB[2]) ⇒ SB0_ERR_ENB[2] | 0<br>0<br>1 |
| SB2_ID == SB23_ID_MCH<br>SB2_ID == SB24_ID_MCH<br>SB2_ID == SB25_ID_MCH | 1<br>0<br>0 | ↑ or ↓ ⇒ XB1_ERR_ENB[2] | 1<br>(B-2) | | |
| (A) | | (B) | | (C) | |

FIG.14

| SAME PARTITION DETERMINATION | RE-SULT | PARTITION DETERMINATION USED FOR BUS BETWEEN XB (ERR_ENB SIGNAL OF 2ND CONTROL UNIT) | RE-SULT | PARTITION DETERMINATION USING 1ST CONTROL UNIT OR 2ND CONTROL UNIT IN COMMON (ERR_ENB SIGNAL OF 1ST CONTROL UNIT) | RE-SULT |
|---|---|---|---|---|---|
| SB3_ID == SB3_ID ⇒ SB33_ID_MCH<br>SB3_ID == SB4_ID ⇒ SB34_ID_MCH<br>SB3_ID == SB5_ID ⇒ SB35_ID_MCH | 1<br>0<br>0 |  |  | SB33_ID_MCH+(XB1_ERR_ENB[3]·XB1_ERR_ENB[3]) ⇒ SB3_ERR_ENB[3]<br>SB34_ID_MCH+(XB1_ERR_ENB[3]·XB1_ERR_ENB[4]) ⇒ SB3_ERR_ENB[4]<br>SB35_ID_MCH+(XB1_ERR_ENB[3]·XB1_ERR_ENB[5]) ⇒ SB3_ERR_ENB[5] | 1<br>0<br>0 |
| SB3_ID == SB0_ID ⇒ SB30_ID_MCH<br>SB3_ID == SB1_ID ⇒ SB31_ID_MCH<br>SB3_ID == SB2_ID ⇒ SB32_ID_MCH | 0<br>0<br>0 | ← or → ⇒ XB0_ERR_ENB[0] | 1 |  |  |
| SB4_ID == SB3_ID ⇒ SB43_ID_MCH<br>SB4_ID == SB4_ID ⇒ SB44_ID_MCH<br>SB4_ID == SB5_ID ⇒ SB45_ID_MCH | 0<br>1<br>1 |  |  | SB43_ID_MCH+(XB1_ERR_ENB[4]·XB1_ERR_ENB[3]) ⇒ SB4_ERR_ENB[3]<br>SB44_ID_MCH+(XB1_ERR_ENB[4]·XB1_ERR_ENB[4]) ⇒ SB4_ERR_ENB[4]<br>SB45_ID_MCH+(XB1_ERR_ENB[4]·XB1_ERR_ENB[5]) ⇒ SB4_ERR_ENB[5] | 0<br>1<br>1 |
| SB4_ID == SB0_ID ⇒ SB40_ID_MCH<br>SB4_ID == SB1_ID ⇒ SB41_ID_MCH<br>SB4_ID == SB2_ID ⇒ SB42_ID_MCH | 0<br>0<br>0 | ← or → ⇒ XB0_ERR_ENB[1] | 0 |  |  |
| SB5_ID == SB3_ID ⇒ SB53_ID_MCH<br>SB5_ID == SB4_ID ⇒ SB54_ID_MCH<br>SB5_ID == SB5_ID ⇒ SB55_ID_MCH | 0<br>1<br>1 |  |  | SB53_ID_MCH+(XB1_ERR_ENB[5]·XB1_ERR_ENB[3]) ⇒ SB5_ERR_ENB[3]<br>SB54_ID_MCH+(XB1_ERR_ENB[5]·XB1_ERR_ENB[4]) ⇒ SB5_ERR_ENB[4]<br>SB55_ID_MCH+(XB1_ERR_ENB[5]·XB1_ERR_ENB[5]) ⇒ SB5_ERR_ENB[5] | 0<br>1<br>1 |
| SB5_ID == SB0_ID ⇒ SB50_ID_MCH<br>SB5_ID == SB1_ID ⇒ SB51_ID_MCH<br>SB5_ID == SB2_ID ⇒ SB52_ID_MCH | 0<br>0<br>0 | ← or → ⇒ XB0_ERR_ENB[2] | 0 |  |  |

FIG.20

|     | SB0 | SB1 | SB2 | SB3 | SB4 | SB5 | SB6 | SB7 |
|-----|-----|-----|-----|-----|-----|-----|-----|-----|
| PID | 1   | 2   | 3   | 4   | 1   | 5   | 6   | 6   |
| VAL | 0   | 0   | 0   | 0   | 0   | 0   | 0   | 0   |

...

| SB8 | SB9 | SB10 | SB11 | SB12 | SB13 | SB14 | SB15 |
|-----|-----|------|------|------|------|------|------|
| 7   | 2   | 2    | 6    | 7    | 3    | 3    | 4    |
| 0   | 0   | 0    | 0    | 0    | 0    | 0    | 0    |

FIG.21

| SAME PARTITION DETERMINATION | RE-SULT | PARTITION DETERMINATION USED FOR BUS BETWEEN XB (ERR_ENB SIGNAL OF 2ND CONTROL UNIT) | RE-SULT |
|---|---|---|---|
| SB0_ID == SB0_ID ⇒ SB00_ID_MCH<br>SB0_ID == SB1_ID ⇒ SB01_ID_MCH<br>SB0_ID == SB2_ID ⇒ SB02_ID_MCH<br>SB0_ID == SB3_ID ⇒ SB03_ID_MCH | 1<br>0<br>0<br>0 | | |
| SB0_ID == SB4_ID ⇒ SB04_ID_MCH<br>SB0_ID == SB5_ID ⇒ SB05_ID_MCH<br>SB0_ID == SB6_ID ⇒ SB06_ID_MCH<br>SB0_ID == SB7_ID ⇒ SB07_ID_MCH | 1<br>0<br>0<br>0 | ↑<br>or  => XB1_ERR_ENB[0]<br>↓ | 1 |
| SB0_ID == SB8_ID ⇒ SB08_ID_MCH<br>SB0_ID == SB9_ID ⇒ SB09_ID_MCH<br>SB0_ID == SBa_ID ⇒ SB0a_ID_MCH<br>SB0_ID == SBb_ID ⇒ SB0b_ID_MCH | 0<br>0<br>0<br>0 | ↑<br>or  => XB2_ERR_ENB[0]<br>↓ | 0 |
| SB0_ID == SBc_ID ⇒ SB0c_ID_MCH<br>SB0_ID == SBd_ID ⇒ SB0d_ID_MCH<br>SB0_ID == SBe_ID ⇒ SB0e_ID_MCH<br>SB0_ID == SBf_ID ⇒ SB0f_ID_MCH | 0<br>0<br>0<br>0 | ↑<br>or  => XB3_ERR_ENB[0]<br>↓ | 0 |
| SB1_ID == SB0_ID ⇒ SB10_ID_MCH<br>SB1_ID == SB1_ID ⇒ SB11_ID_MCH<br>SB1_ID == SB2_ID ⇒ SB12_ID_MCH<br>SB1_ID == SB3_ID ⇒ SB13_ID_MCH | 0<br>1<br>0<br>0 | | |
| SB1_ID == SB4_ID ⇒ SB14_ID_MCH<br>SB1_ID == SB5_ID ⇒ SB15_ID_MCH<br>SB1_ID == SB6_ID ⇒ SB16_ID_MCH<br>SB1_ID == SB7_ID ⇒ SB17_ID_MCH | 0<br>0<br>0<br>0 | ↑<br>or  => XB1_ERR_ENB[1]<br>↓ | 0 |
| SB1_ID == SB8_ID ⇒ SB18_ID_MCH<br>SB1_ID == SB9_ID ⇒ SB19_ID_MCH<br>SB1_ID == SBa_ID ⇒ SB1a_ID_MCH<br>SB1_ID == SBb_ID ⇒ SB1b_ID_MCH | 0<br>1<br>1<br>0 | ↑<br>or  => XB2_ERR_ENB[1]<br>↓ | 1 |
| SB1_ID == SBc_ID ⇒ SB1c_ID_MCH<br>SB1_ID == SBd_ID ⇒ SB1d_ID_MCH<br>SB1_ID == SBe_ID ⇒ SB1e_ID_MCH<br>SB1_ID == SBf_ID ⇒ SB1f_ID_MCH | 0<br>0<br>0<br>0 | ↑<br>or  => XB3_ERR_ENB[1]<br>↓ | 0 |
| SB2_ID == SB0_ID ⇒ SB20_ID_MCH<br>SB2_ID == SB1_ID ⇒ SB21_ID_MCH<br>SB2_ID == SB2_ID ⇒ SB22_ID_MCH<br>SB2_ID == SB3_ID ⇒ SB23_ID_MCH | 0<br>0<br>1<br>0 | | |
| SB2_ID == SB4_ID ⇒ SB24_ID_MCH<br>SB2_ID == SB5_ID ⇒ SB25_ID_MCH<br>SB2_ID == SB6_ID ⇒ SB26_ID_MCH<br>SB2_ID == SB7_ID ⇒ SB27_ID_MCH | 0<br>0<br>0<br>0 | ↑<br>or  => XB1_ERR_ENB[2]<br>↓ | 0 |
| SB2_ID == SB8_ID ⇒ SB28_ID_MCH<br>SB2_ID == SB9_ID ⇒ SB29_ID_MCH<br>SB2_ID == SBa_ID ⇒ SB2a_ID_MCH<br>SB2_ID == SBb_ID ⇒ SB2b_ID_MCH | 0<br>0<br>0<br>0 | ↑<br>or  => XB2_ERR_ENB[2]<br>↓ | 0 |
| SB2_ID == SBc_ID ⇒ SB2c_ID_MCH<br>SB2_ID == SBd_ID ⇒ SB2d_ID_MCH<br>SB2_ID == SBe_ID ⇒ SB2e_ID_MCH<br>SB2_ID == SBf_ID ⇒ SB2f_ID_MCH | 0<br>1<br>1<br>0 | ↑<br>or  => XB3_ERR_ENB[2]<br>↓ | 1 |
| SB3_ID == SB0_ID ⇒ SB30_ID_MCH<br>SB3_ID == SB1_ID ⇒ SB31_ID_MCH<br>SB3_ID == SB2_ID ⇒ SB32_ID_MCH<br>SB3_ID == SB3_ID ⇒ SB33_ID_MCH | 0<br>0<br>0<br>1 | | |
| SB3_ID == SB4_ID ⇒ SB34_ID_MCH<br>SB3_ID == SB5_ID ⇒ SB35_ID_MCH<br>SB3_ID == SB6_ID ⇒ SB36_ID_MCH<br>SB3_ID == SB7_ID ⇒ SB37_ID_MCH | 0<br>0<br>0<br>0 | ↑<br>or  => XB1_ERR_ENB[3]<br>↓ | 0 |
| SB3_ID == SB8_ID ⇒ SB38_ID_MCH<br>SB3_ID == SB9_ID ⇒ SB39_ID_MCH<br>SB3_ID == SBa_ID ⇒ SB3a_ID_MCH<br>SB3_ID == SBb_ID ⇒ SB3b_ID_MCH | 0<br>0<br>0<br>0 | ↑<br>or  => XB2_ERR_ENB[3]<br>↓ | 0 |
| SB3_ID == SBc_ID ⇒ SB3c_ID_MCH<br>SB3_ID == SBd_ID ⇒ SB3d_ID_MCH<br>SB3_ID == SBe_ID ⇒ SB3e_ID_MCH<br>SB3_ID == SBf_ID ⇒ SB3f_ID_MCH | 0<br>0<br>0<br>1 | ↑<br>or  => XB3_ERR_ENB[3]<br>↓ | 1 |

FIG.22

| PARTITION DETERMINATION USING 1ST CONTROL UNIT OR 2ND CONTROL UNIT IN COMMON (ERR_ENB SIGNAL OF 1ST CONTROL UNIT) | RESULT |
|---|---|
| SB00_ID_MCH+(XB1_ERR_ENB[0]·XB1_ERR_ENB[0]+XB2_ERR_ENB[0]·XB2_ERR_ENB[0]+XB3_ERR_ENB[0]·XB3_ERR_ENB[0]) ⇒ SB0_ERR_ENB[0] | 1 |
| SB01_ID_MCH+(XB1_ERR_ENB[0]·XB1_ERR_ENB[1]+XB2_ERR_ENB[0]·XB2_ERR_ENB[1]+XB3_ERR_ENB[0]·XB3_ERR_ENB[1]) ⇒ SB0_ERR_ENB[1] | 0 |
| SB02_ID_MCH+(XB1_ERR_ENB[0]·XB1_ERR_ENB[2]+XB2_ERR_ENB[0]·XB2_ERR_ENB[2]+XB3_ERR_ENB[0]·XB3_ERR_ENB[2]) ⇒ SB0_ERR_ENB[2] | 0 |
| SB03_ID_MCH+(XB1_ERR_ENB[0]·XB1_ERR_ENB[3]+XB2_ERR_ENB[0]·XB2_ERR_ENB[3]+XB3_ERR_ENB[0]·XB3_ERR_ENB[3]) ⇒ SB0_ERR_ENB[3] | 0 |
| SB10_ID_MCH+(XB1_ERR_ENB[1]·XB1_ERR_ENB[0]+XB2_ERR_ENB[1]·XB2_ERR_ENB[0]+XB3_ERR_ENB[1]·XB3_ERR_ENB[0]) ⇒ SB0_ERR_ENB[0] | 0 |
| SB11_ID_MCH+(XB1_ERR_ENB[1]·XB1_ERR_ENB[1]+XB2_ERR_ENB[1]·XB2_ERR_ENB[1]+XB3_ERR_ENB[1]·XB3_ERR_ENB[1]) ⇒ SB0_ERR_ENB[1] | 1 |
| SB12_ID_MCH+(XB1_ERR_ENB[1]·XB1_ERR_ENB[2]+XB2_ERR_ENB[1]·XB2_ERR_ENB[2]+XB3_ERR_ENB[1]·XB3_ERR_ENB[2]) ⇒ SB0_ERR_ENB[2] | 0 |
| SB13_ID_MCH+(XB1_ERR_ENB[1]·XB1_ERR_ENB[3]+XB2_ERR_ENB[1]·XB2_ERR_ENB[3]+XB3_ERR_ENB[1]·XB3_ERR_ENB[3]) ⇒ SB0_ERR_ENB[3] | 0 |
| SB20_ID_MCH+(XB1_ERR_ENB[2]·XB1_ERR_ENB[0]+XB2_ERR_ENB[2]·XB2_ERR_ENB[0]+XB3_ERR_ENB[2]·XB3_ERR_ENB[0]) ⇒ SB0_ERR_ENB[0] | 0 |
| SB21_ID_MCH+(XB1_ERR_ENB[2]·XB1_ERR_ENB[1]+XB2_ERR_ENB[2]·XB2_ERR_ENB[1]+XB3_ERR_ENB[2]·XB3_ERR_ENB[1]) ⇒ SB0_ERR_ENB[1] | 0 |
| SB22_ID_MCH+(XB1_ERR_ENB[2]·XB1_ERR_ENB[2]+XB2_ERR_ENB[2]·XB2_ERR_ENB[2]+XB3_ERR_ENB[2]·XB3_ERR_ENB[2]) ⇒ SB0_ERR_ENB[2] | 1 |
| SB23_ID_MCH+(XB1_ERR_ENB[2]·XB1_ERR_ENB[3]+XB2_ERR_ENB[2]·XB2_ERR_ENB[3]+XB3_ERR_ENB[2]·XB3_ERR_ENB[3]) ⇒ SB0_ERR_ENB[3] | 1 |
| SB30_ID_MCH+(XB1_ERR_ENB[3]·XB1_ERR_ENB[0]+XB2_ERR_ENB[3]·XB2_ERR_ENB[0]+XB3_ERR_ENB[3]·XB3_ERR_ENB[0]) ⇒ SB0_ERR_ENB[0] | 0 |
| SB31_ID_MCH+(XB1_ERR_ENB[3]·XB1_ERR_ENB[1]+XB2_ERR_ENB[3]·XB2_ERR_ENB[1]+XB3_ERR_ENB[3]·XB3_ERR_ENB[1]) ⇒ SB0_ERR_ENB[1] | 0 |
| SB32_ID_MCH+(XB1_ERR_ENB[3]·XB1_ERR_ENB[2]+XB2_ERR_ENB[3]·XB2_ERR_ENB[2]+XB3_ERR_ENB[3]·XB3_ERR_ENB[2]) ⇒ SB0_ERR_ENB[2] | 1 |
| SB33_ID_MCH+(XB1_ERR_ENB[3]·XB1_ERR_ENB[3]+XB2_ERR_ENB[3]·XB2_ERR_ENB[3]+XB3_ERR_ENB[3]·XB3_ERR_ENB[3]) ⇒ SB0_ERR_ENB[3] | 1 |

FIG.23

| SAME PARTITION DETERMINATION | RESULT |
|---|---|
| SB4_ID == SB0_ID ⇒ SB40_ID_MCH | 1 |
| SB4_ID == SB1_ID ⇒ SB41_ID_MCH | 0 |
| SB4_ID == SB2_ID ⇒ SB42_ID_MCH | 0 |
| SB4_ID == SB3_ID ⇒ SB43_ID_MCH | 0 |
| SB4_ID == SB4_ID ⇒ SB44_ID_MCH | 1 |
| SB4_ID == SB5_ID ⇒ SB45_ID_MCH | 0 |
| SB4_ID == SB6_ID ⇒ SB46_ID_MCH | 0 |
| SB4_ID == SB7_ID ⇒ SB47_ID_MCH | 0 |
| SB4_ID == SB8_ID ⇒ SB48_ID_MCH | 0 |
| SB4_ID == SB9_ID ⇒ SB49_ID_MCH | 0 |
| SB4_ID == SBa_ID ⇒ SB4a_ID_MCH | 0 |
| SB4_ID == SBb_ID ⇒ SB4b_ID_MCH | 0 |
| SB4_ID == SBc_ID ⇒ SB4c_ID_MCH | 0 |
| SB4_ID == SBd_ID ⇒ SB4d_ID_MCH | 0 |
| SB4_ID == SBe_ID ⇒ SB4e_ID_MCH | 0 |
| SB4_ID == SBf_ID ⇒ SB4f_ID_MCH | 0 |
| SB5_ID == SB0_ID ⇒ SB50_ID_MCH | 0 |
| SB5_ID == SB1_ID ⇒ SB51_ID_MCH | 0 |
| SB5_ID == SB2_ID ⇒ SB52_ID_MCH | 0 |
| SB5_ID == SB3_ID ⇒ SB53_ID_MCH | 0 |
| SB5_ID == SB4_ID ⇒ SB54_ID_MCH | 0 |
| SB5_ID == SB5_ID ⇒ SB55_ID_MCH | 1 |
| SB5_ID == SB6_ID ⇒ SB56_ID_MCH | 0 |
| SB5_ID == SB7_ID ⇒ SB57_ID_MCH | 0 |
| SB5_ID == SB8_ID ⇒ SB58_ID_MCH | 0 |
| SB5_ID == SB9_ID ⇒ SB59_ID_MCH | 0 |
| SB5_ID == SBa_ID ⇒ SB5a_ID_MCH | 0 |
| SB5_ID == SBb_ID ⇒ SB5b_ID_MCH | 0 |
| SB5_ID == SBc_ID ⇒ SB5c_ID_MCH | 0 |
| SB5_ID == SBd_ID ⇒ SB5d_ID_MCH | 0 |
| SB5_ID == SBe_ID ⇒ SB5e_ID_MCH | 0 |
| SB5_ID == SBf_ID ⇒ SB5f_ID_MCH | 0 |
| SB6_ID == SB0_ID ⇒ SB60_ID_MCH | 0 |
| SB6_ID == SB1_ID ⇒ SB61_ID_MCH | 0 |
| SB6_ID == SB2_ID ⇒ SB62_ID_MCH | 0 |
| SB6_ID == SB3_ID ⇒ SB63_ID_MCH | 0 |
| SB6_ID == SB4_ID ⇒ SB64_ID_MCH | 0 |
| SB6_ID == SB5_ID ⇒ SB65_ID_MCH | 0 |
| SB6_ID == SB6_ID ⇒ SB66_ID_MCH | 1 |
| SB6_ID == SB7_ID ⇒ SB67_ID_MCH | 1 |
| SB6_ID == SB8_ID ⇒ SB68_ID_MCH | 0 |
| SB6_ID == SB9_ID ⇒ SB69_ID_MCH | 0 |
| SB6_ID == SBa_ID ⇒ SB6a_ID_MCH | 0 |
| SB6_ID == SBb_ID ⇒ SB6b_ID_MCH | 1 |
| SB6_ID == SBc_ID ⇒ SB6c_ID_MCH | 0 |
| SB6_ID == SBd_ID ⇒ SB6d_ID_MCH | 0 |
| SB6_ID == SBe_ID ⇒ SB6e_ID_MCH | 0 |
| SB6_ID == SBf_ID ⇒ SB6f_ID_MCH | 0 |
| SB7_ID == SB0_ID ⇒ SB70_ID_MCH | 0 |
| SB7_ID == SB1_ID ⇒ SB71_ID_MCH | 0 |
| SB7_ID == SB2_ID ⇒ SB72_ID_MCH | 0 |
| SB7_ID == SB3_ID ⇒ SB73_ID_MCH | 0 |
| SB7_ID == SB4_ID ⇒ SB74_ID_MCH | 0 |
| SB7_ID == SB5_ID ⇒ SB75_ID_MCH | 0 |
| SB7_ID == SB6_ID ⇒ SB76_ID_MCH | 1 |
| SB7_ID == SB7_ID ⇒ SB77_ID_MCH | 1 |
| SB7_ID == SB8_ID ⇒ SB78_ID_MCH | 0 |
| SB7_ID == SB9_ID ⇒ SB79_ID_MCH | 0 |
| SB7_ID == SBa_ID ⇒ SB7a_ID_MCH | 0 |
| SB7_ID == SBb_ID ⇒ SB7b_ID_MCH | 1 |
| SB7_ID == SBc_ID ⇒ SB7c_ID_MCH | 0 |
| SB7_ID == SBd_ID ⇒ SB7d_ID_MCH | 0 |
| SB7_ID == SBe_ID ⇒ SB7e_ID_MCH | 0 |
| SB7_ID == SBf_ID ⇒ SB7f_ID_MCH | 0 |

FIG.24

| SAME PARTITION DETERMINATION | RESULT |
|---|---|
| SB8_ID == SB0_ID ⇒ SB80_ID_MCH | 0 |
| SB8_ID == SB1_ID ⇒ SB81_ID_MCH | 0 |
| SB8_ID == SB2_ID ⇒ SB82_ID_MCH | 0 |
| SB8_ID == SB3_ID ⇒ SB83_ID_MCH | 0 |
| SB8_ID == SB4_ID ⇒ SB84_ID_MCH | 0 |
| SB8_ID == SB5_ID ⇒ SB85_ID_MCH | 0 |
| SB8_ID == SB6_ID ⇒ SB86_ID_MCH | 0 |
| SB8_ID == SB7_ID ⇒ SB87_ID_MCH | 0 |
| SB8_ID == SB8_ID ⇒ SB88_ID_MCH | 1 |
| SB8_ID == SB9_ID ⇒ SB89_ID_MCH | 0 |
| SB8_ID == SBa_ID ⇒ SB8a_ID_MCH | 0 |
| SB8_ID == SBb_ID ⇒ SB8b_ID_MCH | 0 |
| SB8_ID == SBc_ID ⇒ SB8c_ID_MCH | 1 |
| SB8_ID == SBd_ID ⇒ SB8d_ID_MCH | 0 |
| SB8_ID == SBe_ID ⇒ SB8e_ID_MCH | 0 |
| SB8_ID == SBf_ID ⇒ SB8f_ID_MCH | 0 |
| SB9_ID == SB0_ID ⇒ SB90_ID_MCH | 0 |
| SB9_ID == SB1_ID ⇒ SB91_ID_MCH | 1 |
| SB9_ID == SB2_ID ⇒ SB92_ID_MCH | 0 |
| SB9_ID == SB3_ID ⇒ SB93_ID_MCH | 0 |
| SB9_ID == SB4_ID ⇒ SB94_ID_MCH | 0 |
| SB9_ID == SB5_ID ⇒ SB95_ID_MCH | 0 |
| SB9_ID == SB6_ID ⇒ SB96_ID_MCH | 0 |
| SB9_ID == SB7_ID ⇒ SB97_ID_MCH | 0 |
| SB9_ID == SB8_ID ⇒ SB98_ID_MCH | 0 |
| SB9_ID == SB9_ID ⇒ SB99_ID_MCH | 1 |
| SB9_ID == SBa_ID ⇒ SB9a_ID_MCH | 1 |
| SB9_ID == SBb_ID ⇒ SB9b_ID_MCH | 0 |
| SB9_ID == SBc_ID ⇒ SB9c_ID_MCH | 0 |
| SB9_ID == SBd_ID ⇒ SB9d_ID_MCH | 0 |
| SB9_ID == SBe_ID ⇒ SB9e_ID_MCH | 0 |
| SB9_ID == SBf_ID ⇒ SB9f_ID_MCH | 0 |
| SBa_ID == SB0_ID ⇒ SBa0_ID_MCH | 0 |
| SBa_ID == SB1_ID ⇒ SBa1_ID_MCH | 1 |
| SBa_ID == SB2_ID ⇒ SBa2_ID_MCH | 0 |
| SBa_ID == SB3_ID ⇒ SBa3_ID_MCH | 0 |
| SBa_ID == SB4_ID ⇒ SBa4_ID_MCH | 0 |
| SBa_ID == SB5_ID ⇒ SBa5_ID_MCH | 0 |
| SBa_ID == SB6_ID ⇒ SBa6_ID_MCH | 0 |
| SBa_ID == SB7_ID ⇒ SBa7_ID_MCH | 0 |
| SBa_ID == SB8_ID ⇒ SBa8_ID_MCH | 0 |
| SBa_ID == SB9_ID ⇒ SBa9_ID_MCH | 1 |
| SBa_ID == SBa_ID ⇒ SBaa_ID_MCH | 1 |
| SBa_ID == SBb_ID ⇒ SBab_ID_MCH | 0 |
| SBa_ID == SBc_ID ⇒ SBac_ID_MCH | 0 |
| SBa_ID == SBd_ID ⇒ SBad_ID_MCH | 0 |
| SBa_ID == SBe_ID ⇒ SBae_ID_MCH | 0 |
| SBa_ID == SBf_ID ⇒ SBaf_ID_MCH | 0 |
| SBb_ID == SB0_ID ⇒ SBb0_ID_MCH | 0 |
| SBb_ID == SB1_ID ⇒ SBb1_ID_MCH | 0 |
| SBb_ID == SB2_ID ⇒ SBb2_ID_MCH | 0 |
| SBb_ID == SB3_ID ⇒ SBb3_ID_MCH | 0 |
| SBb_ID == SB4_ID ⇒ SBb4_ID_MCH | 0 |
| SBb_ID == SB5_ID ⇒ SBb5_ID_MCH | 0 |
| SBb_ID == SB6_ID ⇒ SBb6_ID_MCH | 1 |
| SBb_ID == SB7_ID ⇒ SBb7_ID_MCH | 1 |
| SBb_ID == SB8_ID ⇒ SBb8_ID_MCH | 0 |
| SBb_ID == SB9_ID ⇒ SBb9_ID_MCH | 0 |
| SBb_ID == SBa_ID ⇒ SBba_ID_MCH | 0 |
| SBb_ID == SBb_ID ⇒ SBbb_ID_MCH | 1 |
| SBb_ID == SBc_ID ⇒ SBbc_ID_MCH | 0 |
| SBb_ID == SBd_ID ⇒ SBbd_ID_MCH | 0 |
| SBb_ID == SBe_ID ⇒ SBbe_ID_MCH | 0 |
| SBb_ID == SBf_ID ⇒ SBbf_ID_MCH | 0 |

FIG.25

| SAME PARTITION DETERMINATION | RESULT |
|---|---|
| SBc_ID == SB0_ID ⇒ SBc0_ID_MCH | 0 |
| SBc_ID == SB1_ID ⇒ SBc1_ID_MCH | 0 |
| SBc_ID == SB2_ID ⇒ SBc2_ID_MCH | 0 |
| SBc_ID == SB3_ID ⇒ SBc3_ID_MCH | 0 |
| SBc_ID == SB4_ID ⇒ SBc4_ID_MCH | 0 |
| SBc_ID == SB5_ID ⇒ SBc5_ID_MCH | 0 |
| SBc_ID == SB6_ID ⇒ SBc6_ID_MCH | 0 |
| SBc_ID == SB7_ID ⇒ SBc7_ID_MCH | 0 |
| SBc_ID == SB8_ID ⇒ SBc8_ID_MCH | 1 |
| SBc_ID == SB9_ID ⇒ SBc9_ID_MCH | 0 |
| SBc_ID == SBa_ID ⇒ SBca_ID_MCH | 0 |
| SBc_ID == SBb_ID ⇒ SBcb_ID_MCH | 0 |
| SBc_ID == SBc_ID ⇒ SBcc_ID_MCH | 1 |
| SBc_ID == SBd_ID ⇒ SBcd_ID_MCH | 0 |
| SBc_ID == SBe_ID ⇒ SBce_ID_MCH | 0 |
| SBc_ID == SBf_ID ⇒ SBcf_ID_MCH | 0 |
| SBd_ID == SB0_ID ⇒ SBd0_ID_MCH | 0 |
| SBd_ID == SB1_ID ⇒ SBd1_ID_MCH | 0 |
| SBd_ID == SB2_ID ⇒ SBd2_ID_MCH | 1 |
| SBd_ID == SB3_ID ⇒ SBd3_ID_MCH | 0 |
| SBd_ID == SB4_ID ⇒ SBd4_ID_MCH | 0 |
| SBd_ID == SB5_ID ⇒ SBd5_ID_MCH | 0 |
| SBd_ID == SB6_ID ⇒ SBd6_ID_MCH | 0 |
| SBd_ID == SB7_ID ⇒ SBd7_ID_MCH | 0 |
| SBd_ID == SB8_ID ⇒ SBd8_ID_MCH | 0 |
| SBd_ID == SB9_ID ⇒ SBd9_ID_MCH | 0 |
| SBd_ID == SBa_ID ⇒ SBda_ID_MCH | 0 |
| SBd_ID == SBb_ID ⇒ SBdb_ID_MCH | 0 |
| SBd_ID == SBc_ID ⇒ SBdc_ID_MCH | 0 |
| SBd_ID == SBd_ID ⇒ SBdd_ID_MCH | 1 |
| SBd_ID == SBe_ID ⇒ SBde_ID_MCH | 1 |
| SBd_ID == SBf_ID ⇒ SBdf_ID_MCH | 0 |
| SBe_ID == SB0_ID ⇒ SBe0_ID_MCH | 0 |
| SBe_ID == SB1_ID ⇒ SBe1_ID_MCH | 0 |
| SBe_ID == SB2_ID ⇒ SBe2_ID_MCH | 1 |
| SBe_ID == SB3_ID ⇒ SBe3_ID_MCH | 0 |
| SBe_ID == SB4_ID ⇒ SBe4_ID_MCH | 0 |
| SBe_ID == SB5_ID ⇒ SBe5_ID_MCH | 0 |
| SBe_ID == SB6_ID ⇒ SBe6_ID_MCH | 0 |
| SBe_ID == SB7_ID ⇒ SBe7_ID_MCH | 0 |
| SBe_ID == SB8_ID ⇒ SBe8_ID_MCH | 0 |
| SBe_ID == SB9_ID ⇒ SBe9_ID_MCH | 0 |
| SBe_ID == SBa_ID ⇒ SBea_ID_MCH | 0 |
| SBe_ID == SBb_ID ⇒ SBeb_ID_MCH | 0 |
| SBe_ID == SBc_ID ⇒ SBec_ID_MCH | 0 |
| SBe_ID == SBd_ID ⇒ SBed_ID_MCH | 1 |
| SBe_ID == SBe_ID ⇒ SBee_ID_MCH | 1 |
| SBe_ID == SBf_ID ⇒ SBef_ID_MCH | 0 |
| SBf_ID == SB0_ID ⇒ SBf0_ID_MCH | 0 |
| SBf_ID == SB1_ID ⇒ SBf1_ID_MCH | 0 |
| SBf_ID == SB2_ID ⇒ SBf2_ID_MCH | 0 |
| SBf_ID == SB3_ID ⇒ SBf3_ID_MCH | 1 |
| SBf_ID == SB4_ID ⇒ SBf4_ID_MCH | 0 |
| SBf_ID == SB5_ID ⇒ SBf5_ID_MCH | 0 |
| SBf_ID == SB6_ID ⇒ SBf6_ID_MCH | 0 |
| SBf_ID == SB7_ID ⇒ SBf7_ID_MCH | 0 |
| SBf_ID == SB8_ID ⇒ SBf8_ID_MCH | 0 |
| SBf_ID == SB9_ID ⇒ SBf9_ID_MCH | 0 |
| SBf_ID == SBa_ID ⇒ SBfa_ID_MCH | 0 |
| SBf_ID == SBb_ID ⇒ SBfb_ID_MCH | 0 |
| SBf_ID == SBc_ID ⇒ SBfc_ID_MCH | 0 |
| SBf_ID == SBd_ID ⇒ SBfd_ID_MCH | 0 |
| SBf_ID == SBe_ID ⇒ SBfe_ID_MCH | 0 |
| SBf_ID == SBf_ID ⇒ SBff_ID_MCH | 1 |

# CONTROL SYSTEM FOR DRIVING A DATA PROCESSING APPARATUS

CROSS-REFERENCE TO RELATED APPLICATION

This application is a continuation of International Application No. PCT/JP2008/060166, filed on Jun. 2, 2008, the entire contents of which are incorporated herein by reference.

FIELD

The embodiments discussed herein are directed to a data processing system and a data processing method.

BACKGROUND

A computer system in which combinations of predetermined system boards (SB) among a plurality of system boards mounted on the computer system are managed as partitions that logically divide the system and data processing is performed for respective system boards belonging to each partition has been known (see Japanese Laid-open Patent Publication No. 2006-31199).

The configuration of such a computer system will be described more concretely. The computer system includes a plurality of data transfer circuits called crossbar units (KB) and a plurality of system boards is connected to each crossbar unit.

The computer system includes a system controller (corresponding to, for example, SCF (System Control Facility) or MMB (Management Board)) that controls communication between system boards belonging to the same partition by managing each first control unit and each second control unit included in each crossbar unit.

The first control unit of these control units each corresponds to each system board connected to the crossbar unit and performs priority control of communication between system boards by controlling communication between each system board under control among system boards connected to the crossbar unit and the crossbar unit.

The second control unit each corresponds to a different crossbar unit from the crossbar unit including the second control unit and performs priority control of communication between system boards by controlling communication between the crossbar unit including the second control unit and each of different crossbar units.

If a control unit (a first control unit or second control unit) included in a crossbar unit fails in such a computer system, stuck-at control to cause the system board corresponding to the failed control unit to be stuck (separate) from under the control of the failed control unit is performed.

A concrete example of the stuck-at control will be described. If a first control unit fails, the crossbar unit sends an error signal to the system controller.

The system controller that has received the error signal sends a stop command to temporarily stop driving of all system boards. Subsequently, the system controller sends a re-drive command to re-drive each system board excluding the system board corresponding to the failed first control unit.

In this manner, the computer system causes the system board corresponding to the failed control unit to be stuck from under the control of the failed control unit.

The above conventional technique has a problem that the availability ratio of a computer system falls when stuck-at control is performed. That is, a conventional computer system has a problem that the availability ratio of the computer system falls because driving of system boards that are not subject to the failed control unit, in other words, driving of system boards whose driving need not be stopped is also stopped when stuck-at control is performed.

SUMMARY

According to an aspect of an embodiment of the invention, a data processing system includes data processing apparatuses that process data; a data transfer apparatus that include control units to control communication between the data processing apparatuses and include a processing apparatus information sending unit that sends, when the control unit fails, a piece of processing apparatus information corresponding to the data processing apparatus under control of the failed control unit from among pieces of processing apparatus information uniquely attached respectively to the data processing apparatuses to a system control apparatus; and the system control apparatus that includes a stop command sending unit that determines to which of partitions that logically divide the system the data processing apparatus corresponding to the piece of processing apparatus information received from the data transfer apparatus belongs, the stop command sending unit sending a stop command to stop driving of the data processing apparatus belonging to the determined partition.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 12 is a diagram exemplifying the information stored in the partition ID register according to the first embodiment;

FIG. 13 is a diagram illustrating processing by an enable signal generation unit according to the first embodiment;

FIG. 14 is a diagram illustrating the processing by the enable signal generation unit according to the first embodiment;

FIG. 20 is a diagram exemplifying the information stored in the partition ID register according to the second embodiment;

FIG. 21 is a diagram illustrating the processing by the enable signal generation unit according to the second embodiment;

FIG. 22 is a diagram illustrating the processing by the enable signal generation unit according to the second embodiment;

FIG. 23 is a diagram illustrating the processing by the enable signal generation unit according to the second embodiment;

FIG. 24 is a diagram illustrating the processing by the enable signal generation unit according to the second embodiment;

FIG. 25 is a diagram illustrating the processing by the enable signal generation unit according to the second embodiment;

DESCRIPTION OF EMBODIMENT

A preferred embodiment of the present invention will be explained with reference to accompanying drawings. A computer system an embodiment of the present invention will be described in the order of an overview of the computer system, the configuration of the computer system, and processing by the computer system and lastly, effects of the computer system will be described.

Overview of the Computer System

Figure 1:
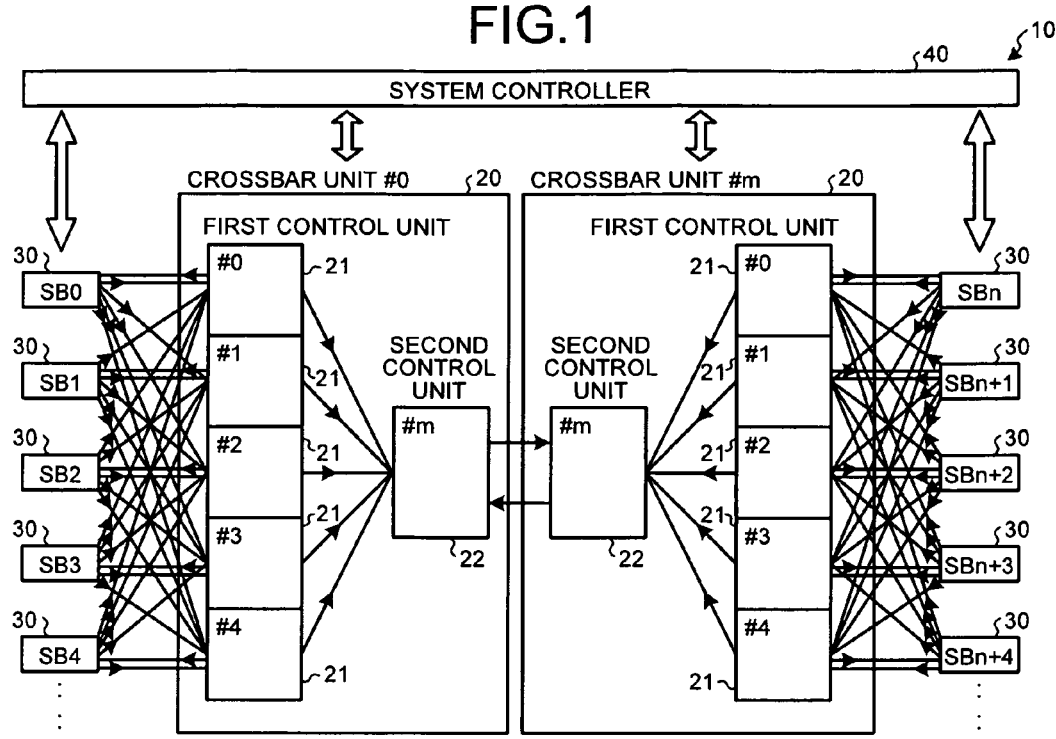
FIG. 1 is a diagram illustrating a physical connection of a computer system.
Figure 2:
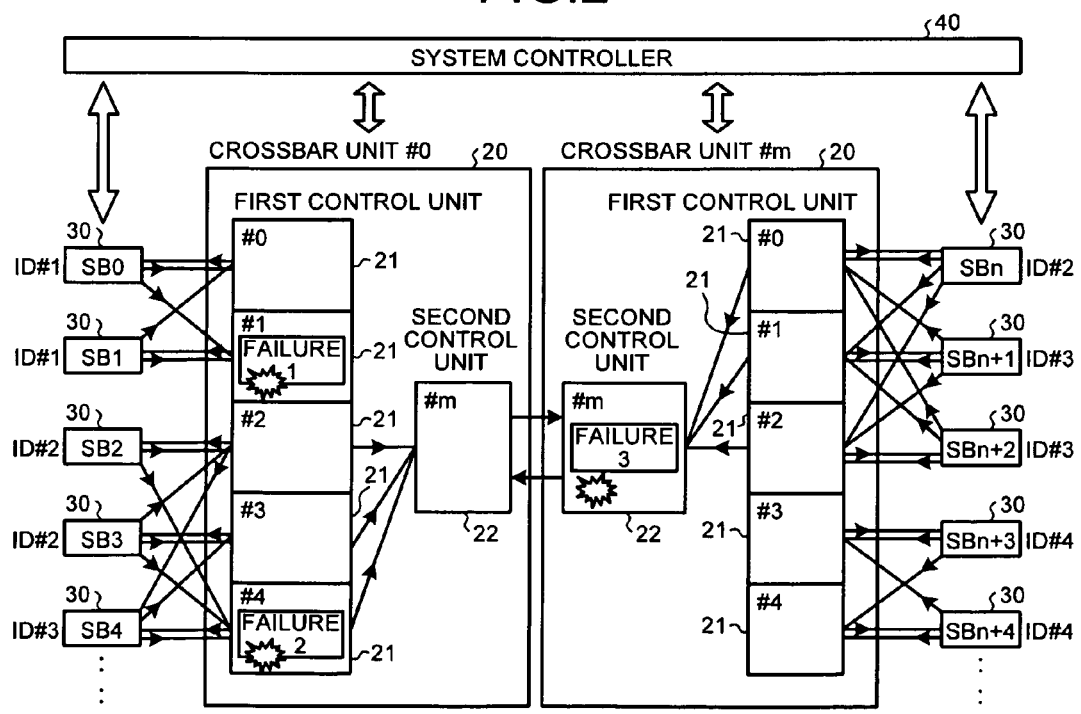
FIG. 2 is a diagram illustrating partitions built in the computer system.

First, an overview of a computer system 10 will be provided using FIGS. 1 and 2. FIG. 1 is a diagram illustrating a physical connection of a computer system. FIG. 2 is a diagram illustrating partitions built computer system.

As illustrated in FIG. 1, the computer system 10 includes a plurality of crossbar units (XB) 20, a plurality of system boards (SB) 30, and a system controller 40. Each component of the computer system 10 has a physical connection illustrated in FIG. 1.

An ID (for example, "SB0" and "SB1") to identify the system board 30 is attached to each of the system boards 30. Hereinafter, the system board 30 corresponding to "SB0" will be denoted as a system board 30 "SB0".

Also, an ID (for example, "#0" and "#1") to identify each component is attached to the crossbar unit 20, a first control unit 21, and a second control unit 22. Hereinafter, for example, the first control unit 21 corresponding to "#0" will be denoted as the first control unit 21 "#0".

When a control unit (the first control unit 21 or the second control unit 22) fails, the crossbar unit 20 of the computer system 10 sends an error signal corresponding to, among the system boards 30, the system board 30 under the control of the failed control unit to the system controller 40.

Subsequently, the system controller 40 determines to which of partitions that logically divide the system the system board 30 corresponding to each error signal belong and sends a stop command to stop driving of each of the system boards 30 belonging to the determined partition.

Failure 1

Degradation control by the computer system 10 will be described below by taking concrete examples. A partition ID (for example, "#1" and "#2") attached uniquely is attached to each partition to which the system board 30 belongs. Hereinafter, the partition corresponding to "ID#1" will be denoted as the partition "ID#1".

First, a case when the first control unit 21 included in the crossbar unit 20 "#0" fails will be described as Failure 1 (see Failure 1 in FIG. 2).

In the case of Failure 1, the crossbar unit 20 "#0" sends an error signal of the system board 30 "SB0" and a system board 30 "SB1" under the control of the first control unit 21 "#1" included in the crossbar unit 20 "#0" to the system controller 40.

The system controller 40 that has received the error signal of the system board 30 "SB0" and the system board 30 "SB1" determines that the system board 30 "SB0" and the system board 30 "SB1" belong to the partition "ID#1".

Subsequently, the system controller 40 sends a stop command to stop driving of the system board 30 "SB0" and the system board 30 "SB1" belonging to the partition "ID#1".

Then, the system controller 40 sends a re-drive command to re-drive the system board 30 "SB0" before completing the stuck-at control.

Failure 2

Next, a case when the first control unit 21 "#4" included in the crossbar unit 20 "#0" fails will be described as Failure 2 (see Failure 2 in FIG. 2).

In the case of Failure 2, the crossbar unit 20 "#0" notifies the system controller 40 of an error signal of a system board 30 "SB2", a system board 30 "SB3", and a system board 30 "SB4" under the control of the first control unit 21 "#4" included in the crossbar unit 20 "#0".

The system controller 40 that has received the error signal of the system board 30 "SB2", the system board 30 "SB3", and the system board 30 "SB4" determines that the system board 30 "SB2" and the system board 30 "SB3" belong to a partition "ID#2".

The system controller 40 also determines that the system board 30 "SB4" belongs to a partition "ID#3".

Subsequently, the system controller 40 sends a stop command to stop driving of the system board 30 "SB2", the system board 30 "SB3", and a system board 30 "SBn" belonging to the partition "ID#2".

The system controller 40 also sends a stop command to stop driving of the system board 30 "SB4", a system board 30 "SBn+1", and a system board 30 "SBn+2" belonging to the partition "ID#3".

Then, the system controller 40 sends a re-drive command to re-drive the system board 30 "SB2", the system board 30 "SB3", the system board 30 "SBn", the system board 30 "SBn+1", and the system board 30 "SBn+2" before completing the stuck-at control.

Failure 3

Next, a case when the second control unit 22 "#m" included in a crossbar unit 20 "#m" fails will be described as Failure 3 (see Failure 3 in FIG. 2).

In the case of Failure 3, the crossbar unit 20 "#m" notifies the system controller 40 of an error signal of the system board 30 "SBn", the system board 30 "SBn+1", and the system board 30 "SBn+2" under the control of the second control unit 22 "#m" included in the crossbar unit 20 "#m".

The system controller 40 that has received the error signal of the system board 30 "SBn", the system board 30 "SBn+1", and the system board 30 "SBn+2" determines that the system board 30 "SBn" belongs to the partition "ID#2".

The system controller 40 also determines that the system board 30 "SBn+1" and the system board 30 "SBn+2" belong to the partition "ID#3".

Subsequently, the system controller 40 sends a stop command to stop driving of the system board 30 "SB2", the system board 30 "SB3", and the system board 30 "SBn" belonging to the partition "ID#2".

The system controller 40 also sends a stop command to stop driving of the system board 30 "SB4", a system board 30 "SBn+1", and a system board 30 "SBn+2" belonging to the partition "ID#3".

Then, the system controller 40 sends a re-drive command to re-drive the system board 30 "SB2", the system board 30 "SB3", and the system board 30 "SB4" before completing the stuck-at control.

Configuration of the Computer System

Figure 3:
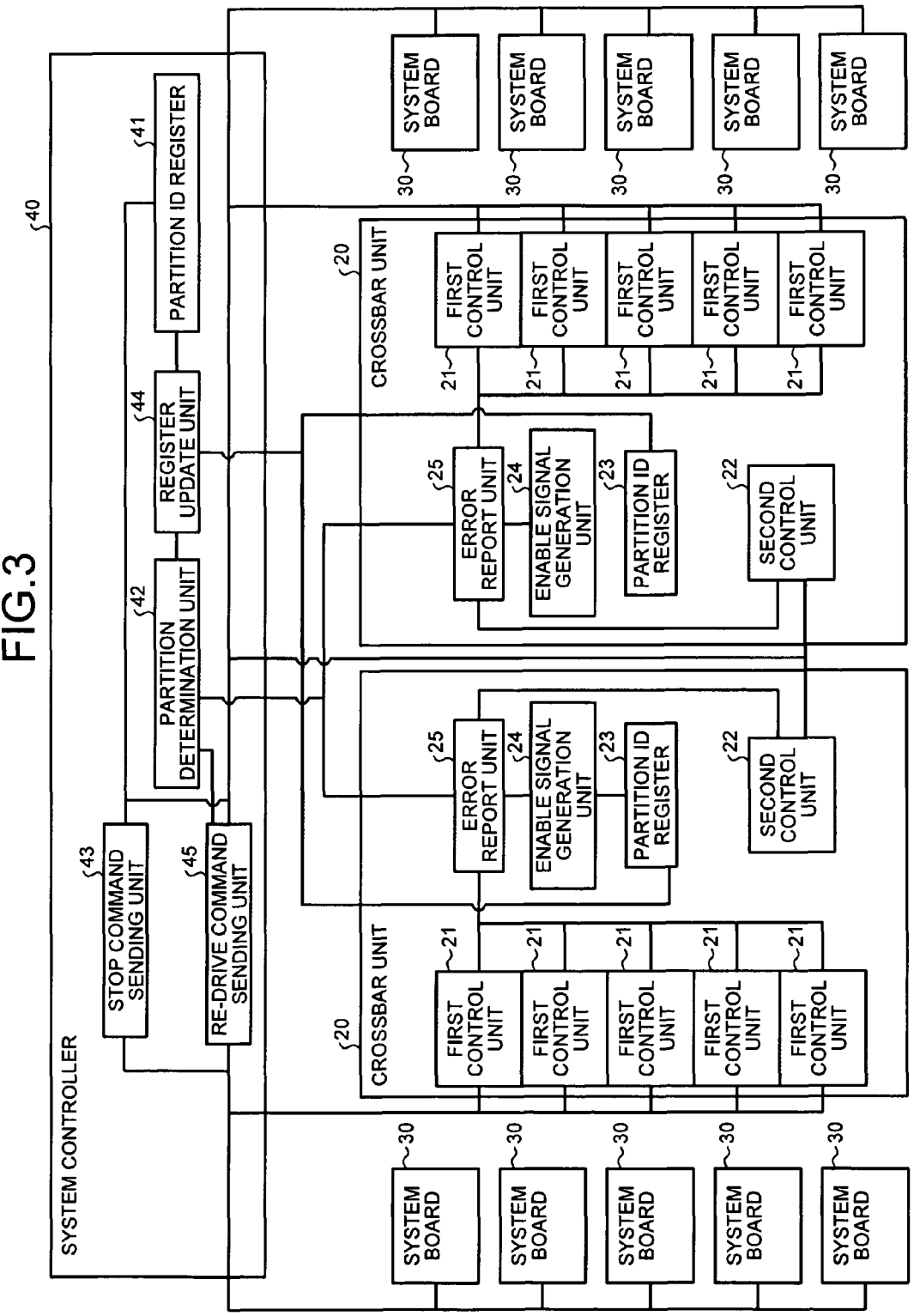
FIG. 3 is a diagram exemplifying the configuration of the computer system.
Figures 4, 5:
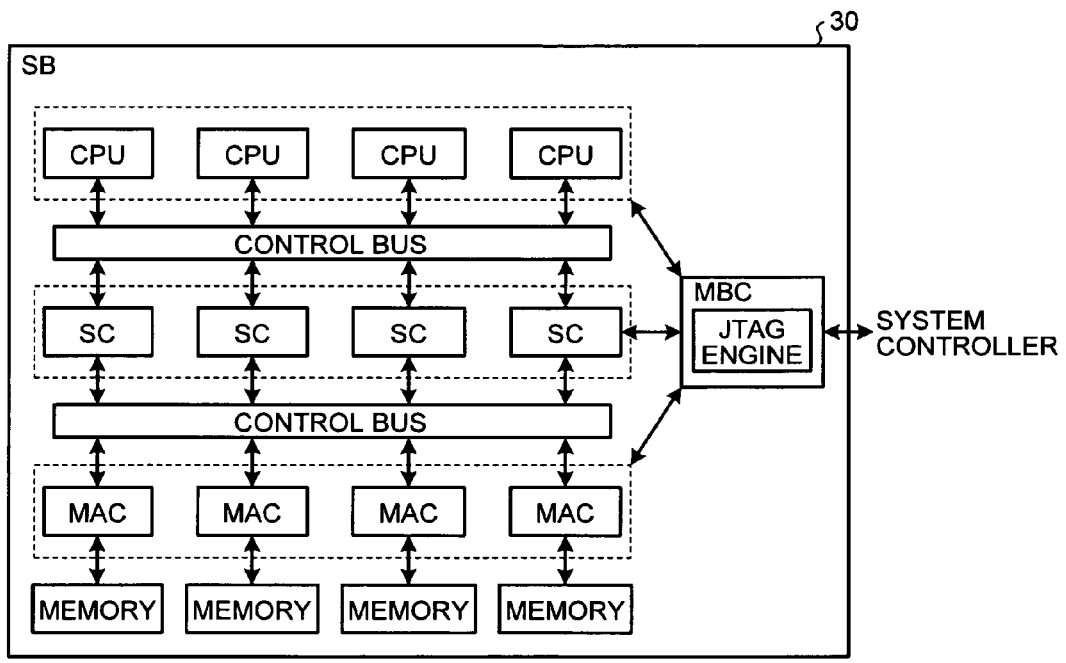
FIG. 4 is a diagram exemplifying information stored in a partition ID register.
FIG. 5 is a diagram exemplifying the configuration of a system board.
Figure 6:
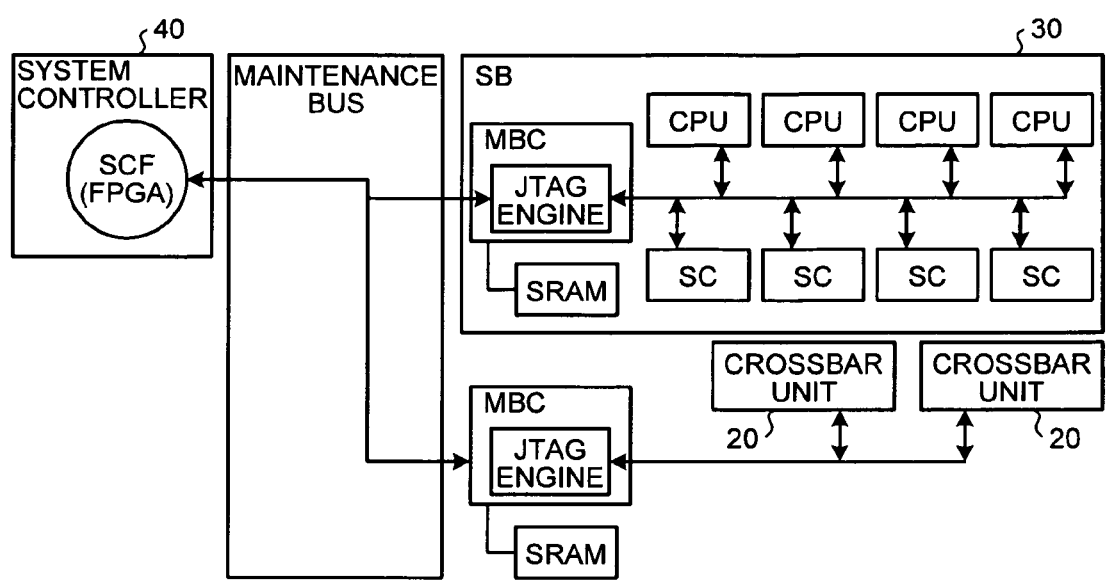
FIG. 6 is a diagram exemplifying a connection of components.
Figure 7:
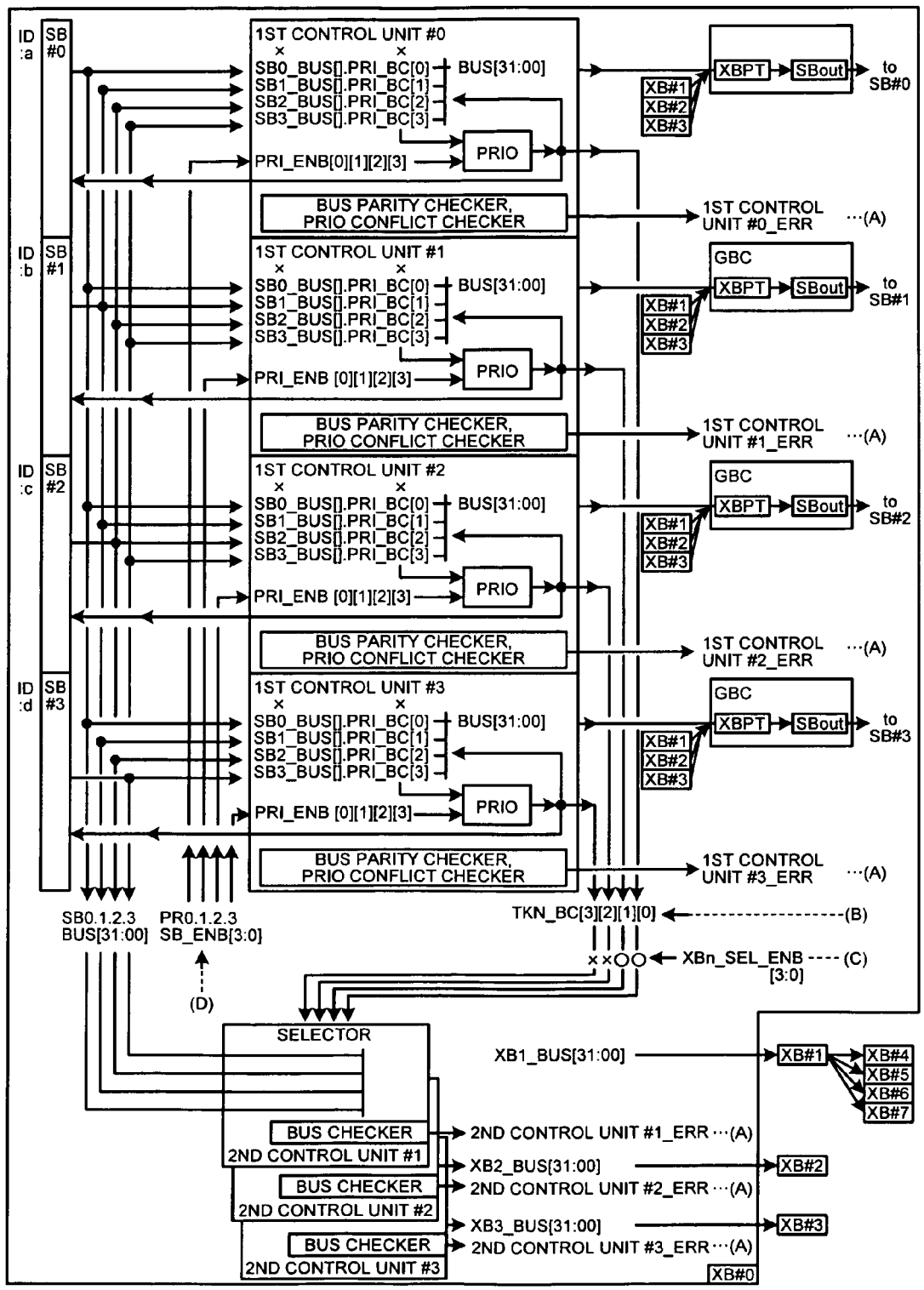
FIG. 7 is a diagram exemplifying the configuration of a crossbar unit.

Next, the function configuration of the computer system 10 will be described using FIGS. 3 to 7. FIG. 3 is a diagram exemplifying the configuration of the computer system. FIG. 4 is a diagram exemplifying information stored in a partition ID register. FIG. 5 is a diagram exemplifying the configuration of a system board. FIG. 6 is a diagram exemplifying a connection of components. FIG. 7 is a diagram exemplifying the configuration of a crossbar unit.

As illustrated in FIG. 3, the computer system 10 includes the plurality of crossbar units 20, the plurality of system boards 30, and the system controller 40.

The crossbar unit 20 includes, in addition to a plurality of first control units 21 and the single (or a plurality of) second control unit(s) 22, particularly a partition ID register 23, an enable signal generation unit 24, and an error report unit 25.

The first control unit 21 controls communication between the system board 30 connected to the crossbar unit 20 and the crossbar unit 20. In other words, the first control unit 21 performs priority control of communication between the crossbar unit 20 and each of the system boards 30.

The second control unit 22 is connected to the first control units 21 to control communication with the other crossbar units 20. In other words, the second control unit 22 performs priority control of communication between the crossbar units 20.

The partition ID register 23 stores information copying IDs of partitions stored in a partition ID register 41 described later. The partition ID register 23 may also be referred to as a copying information storage unit.

The enable signal generation unit 24 generates an enable signal to determine whether each of the system boards 30 connected to the crossbar unit 20 is under the control of the failed control unit by using IDs of partitions stored in the partition ID register 23.

The error report unit 25 sends, when a control unit fails, an error signal of each of the system boards 30 under the control of the failed control unit to the system controller 40.

More specifically, the error report unit 25 receives an error signal that is sent from a failed control unit and identifies the control unit.

Subsequently, the error report unit 25 determines, among the system boards 30 connected to the crossbar unit 20, the system boards 30 under the control of the failed control unit based on the received error signal and an enable signal generated by the enable signal generation unit 24.

Then, the error report unit 25 sends an error signal of the determined system boards 30 to the system controller 40. The error report unit 25 may also be referred to as a processing apparatus information sending unit.

If an error signal sent from the first control unit 21 is received, the error report unit 25 further sends the error signal to the system controller 40.

If an error signal sent from the second control unit 22 is received, the error report unit 25 sends an error signal of the system boards 30 configured to be able to identify the second control unit 22 that has sent the error signal to the system controller 40.

Particularly, the system controller 40 includes the partition ID register 41, a partition determination unit 42, a stop command sending unit 43, a register update unit 44, and a re-drive command sending unit 45.

The partition ID register 41 stores IDs of partitions uniquely attached to the partition to which the system board 30 belongs by associating with each of the system boards 30.

More specifically, as illustrated in FIG. 4, the partition ID register 41 stores the partition ID (PID) and valid information (VAL) whether to send a re-drive command by associating with each of the system boards 30.

Valid information "0" means sending a re-drive command and valid information "1" means not sending a re-drive command. The partition ID register 41 may also be referred to as a partition information storage unit.

The partition determination unit 42 determines to which of partitions that logically divide the system the system board 30 corresponding to the error signal of the system board 30 received from the crossbar unit 20 belongs.

More specifically, the partition determination unit 42 determines the system boards 30 associated with the partition having the same ID as the partition ID corresponding to an error signal of the system board 30 received from the crossbar unit 20 from the partition ID register 41. The partition ID register 41 may also be referred to as a stop command sending unit.

The stop command sending unit 43 sends a stop command to each of the determined system boards 30. The stop command sending unit 43 may also be referred to as a stop command sending unit.

If an error signal sent from the first control unit 21 is received, the register update unit 44 registers sending disapproval information with the partition ID register 41 by associating with the system board 30 to which a re-drive command is not to be sent.

If an error signal of the system board 30 of the second control unit 22 is received, the register update unit 44 registers sending disapproval information with the partition ID register 41 by associating with the error signal of the system board 30.

Then, the register update unit 44 causes the partition ID register 23 to update by generating copy information by copying IDs of partitions stored in the partition ID register 41.

After sending disapproval information being registered by the register update unit 44, the re-drive command sending unit 45 determines whether sending disapproval information is registered with the partition ID register 41 by being associated with each of the system boards 30 acquired by the stop command sending unit 43.

The re-drive command sending unit 45 sends a re-drive command to the system boards 30 corresponding to the system boards 30 for which a determination result that sending disapproval information is not stored by being associated therewith is obtained.

The system board 30 is a device as illustrated in FIG. 5. An "SC (system bus controller)" performs bus control between the CPU, SC, MAC, and the crossbar unit 20. A "MAC (memory access controller)" performs bus control between memories (for example, DIMM). A "MBC (maintenance bus controller)" includes interfaces with all chips included in the system board 30 and also performs bus control between the system board 30 and the system controller 40.

Also in the computer system 10, as illustrated in FIG. 6, the crossbar unit 20 and the system board 30 perform communication with the system controller 40. Each MBC is connected through a serial interface called a maintenance bus and the function thereof is realized by firmware. For example, information stored in the partition ID register 23 is information set as JTAG (Joint Test Action Group) by firmware via the MBC.

The crossbar unit 20 is a device as illustrated in FIG. 7. (A) in FIG. 7 is an error signal sent from each control unit to the error report unit 25 (not illustrated in FIG. 7). (B) in FIG. 7 and (C) in FIG. 7 are signals used by the second control unit 22 for priority control. (D) in FIG. 7 is a signal used by the first control unit 21 for priority control.

Configuration of the Computer System

Figure 8:
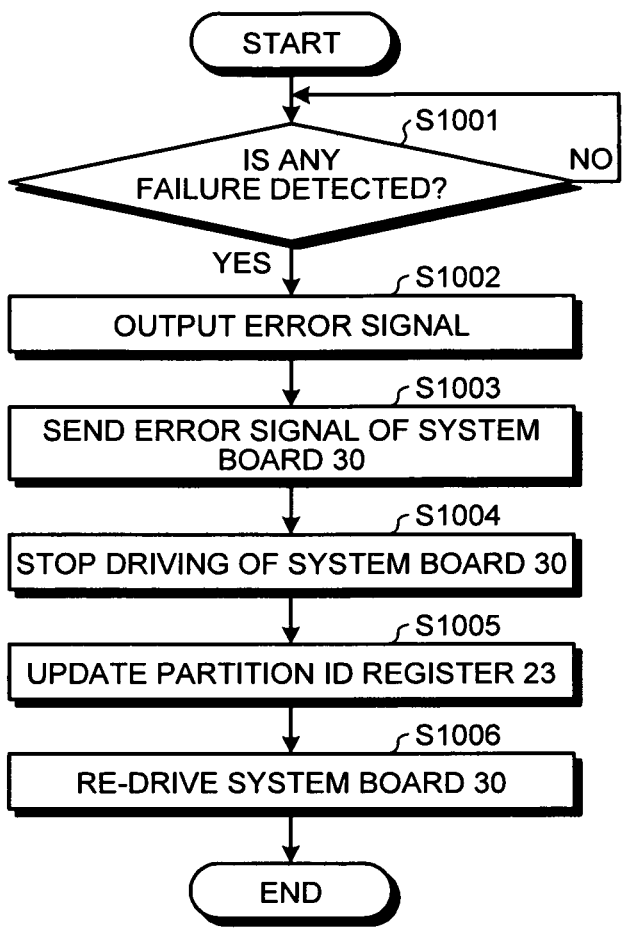
FIG. 8 is a flow chart illustrating the flow of processing by the crossbar unit.
Figure 9:
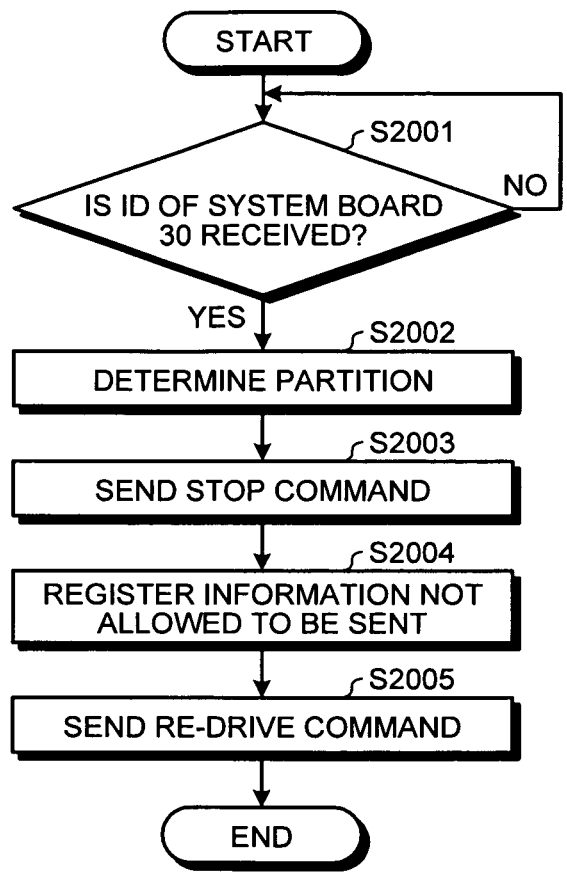
FIG. 9 is a flow chart illustrating the flow of processing by a system controller.

Next, processing by the computer system 10 will be described using FIGS. 8 and 9. FIG. 8 is a flow chart illustrating the flow of processing by a crossbar unit. FIG. 9 is a flow chart illustrating the flow of processing by a system controller.

When, as illustrated in FIG. 8, the crossbar unit 20 detects that a control unit has failed (step S1001, Yes), the crossbar unit 20 outputs an error signal from the failed control unit (step S1002).

Subsequently, the crossbar unit 20 determines the system boards 30 under the control of the failed control unit and sends an error signal of the determined system boards 30 to the system controller 40 (step S1003).

Then, the crossbar unit 20 stops driving of the system boards 30 according to a stop command received from the system controller 40 (step S1004).

Subsequently, the crossbar unit 20 receives copy information from the system controller 40 to update information registered with the partition ID register 23 (step S1005).

Then, the crossbar unit 20 restarts driving of the system boards 30 according to a re-drive command received from the system controller 40 (step S1006) before completing the processing.

When, as illustrated in FIG. 9, the system controller 40 receives an error signal of the system board 30 from the crossbar unit 20 (step S2001, Yes), the system controller 40 determines the partition to which the system board 30 corresponding to the received system board 30 belongs (step S2002).

Subsequently, the system controller 40 sends a stop command to stop each of the system boards 30 belonging, to the determined partition (step S2003) and registers sending disapproval information with the partition ID register 41 to update the partition ID register 23 (step S2004).

Subsequently, the system controller 40 sends a re-drive command to the system boards 30 for which a determination result that sending disapproval information is not stored by being associated therewith is obtained (step S2005) before completing the processing.

Effects by the Computer System

According to the computer system 10, as described above, stuck-at control can be performed without causing the availability ratio of a computer system to fall. For example, stuck-at control can be performed without causing the availability ratio of a computer system to fall because the computer system 10 performs stuck-at control without stopping driving of each of the system boards 30 that is not subject to the control of a failed control unit.

Also according to the computer system 10, the partitions to which the system boards 30 under the control of a failed control unit belong can be determined based on correspondence information between the system board 30 and partition ID and therefore, stuck-at control can be performed without causing the availability ratio of a computer system to fall.

Also according to the computer system 10, the system boards 30 under the control of a failed control unit can be determined based on an enable signal and error signal and therefore, stuck-at control can be performed without causing the availability ratio of a computer system to fall.

Also according to the computer system 10, driving of, among system boards under the control of a failed control unit, each system board excluding the system board corresponding to the failed control unit can be restarted and therefore, stuck-at control can be performed without causing the availability ratio of a computer system to fall.

[a] First Embodiment

In the first embodiment, the computer system 10 will be described in more detail by taking concrete examples. The first embodiment will be described in the order of the configuration of a computer system according to the first embodiment and effects of the first embodiment.

Configuration of a Computer System According to First Embodiment

First, the configuration of a computer system according to the first embodiment will be described using FIGS. 10 to 17. Details of the configuration of the computer system 10 described above will be described below.

Figure 10:
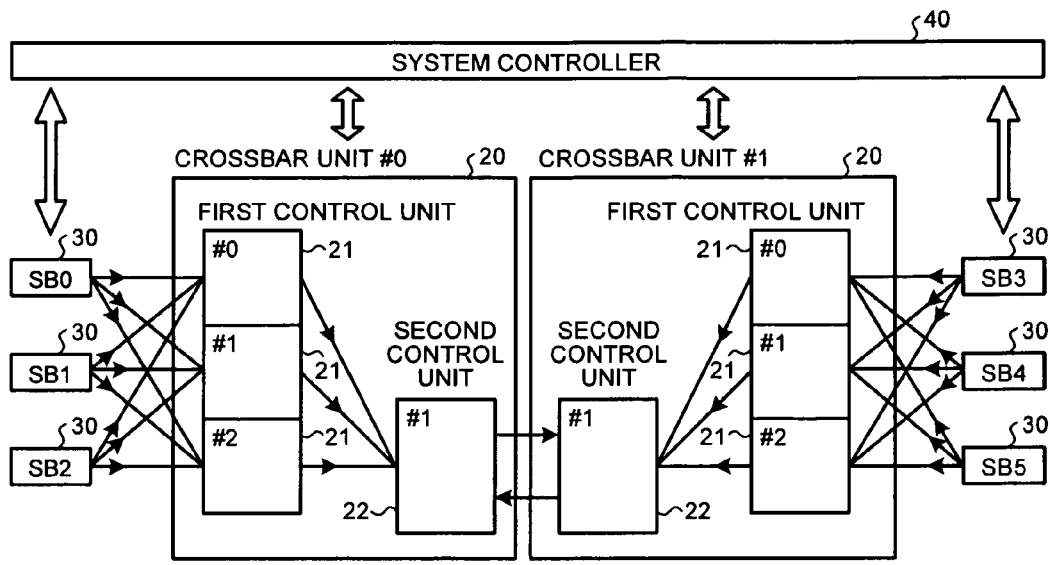
FIG. 10 is a diagram illustrating the physical connection of the computer system according to a first embodiment.
Figure 11:
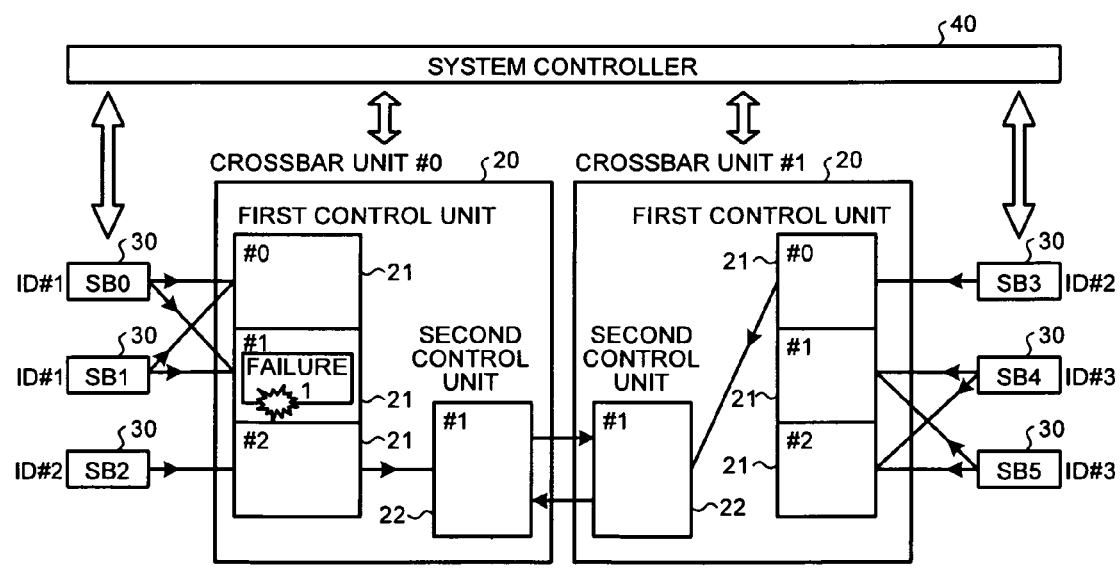
FIG. 11 is a diagram illustrating partitions built in the computer system according to the first embodiment.

FIG. 10 is a diagram illustrating the physical connection of a computer system according to the first embodiment. FIG. 11 is a diagram illustrating partitions built in the computer system according to the first embodiment. FIG. 12 is a diagram exemplifying information stored in a partition ID register according to the first embodiment.

Figure 15:
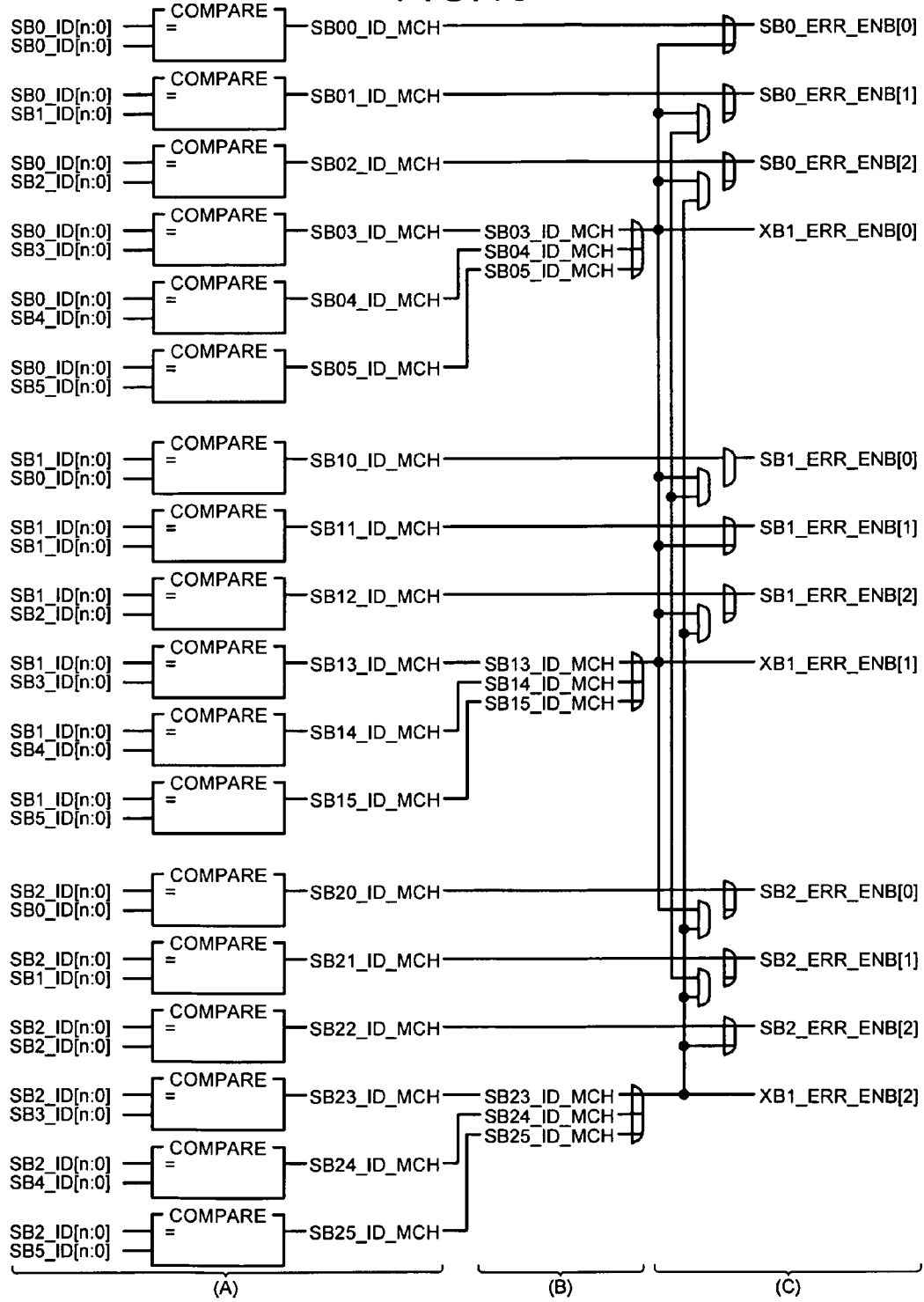
FIG. 15 is a diagram exemplifying a circuit configuration of the enable signal generation unit according to the first embodiment.
Figure 16:
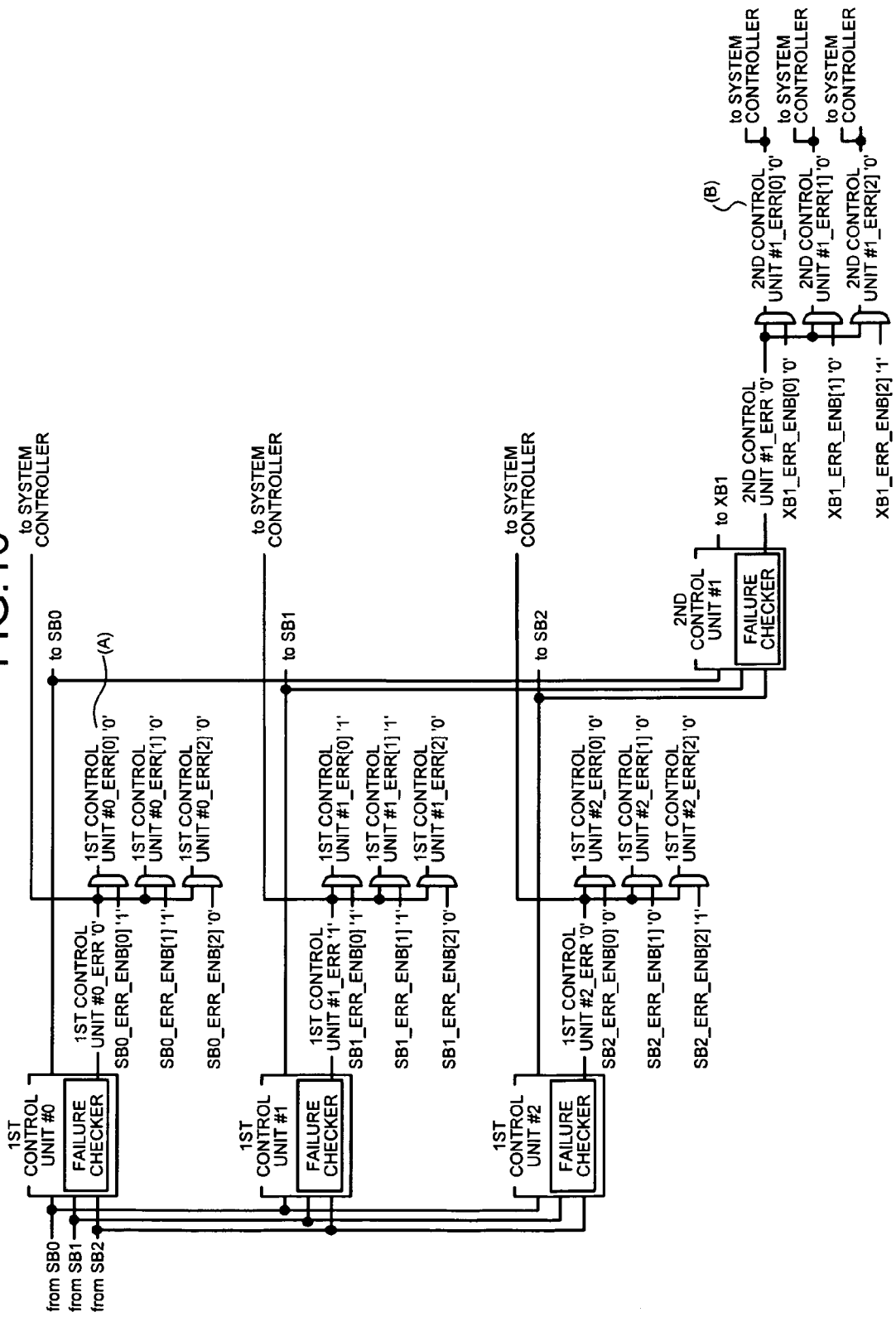
FIG. 16 is a diagram exemplifying the circuit configuration of an error report unit according to the first embodiment.
Figure 17:
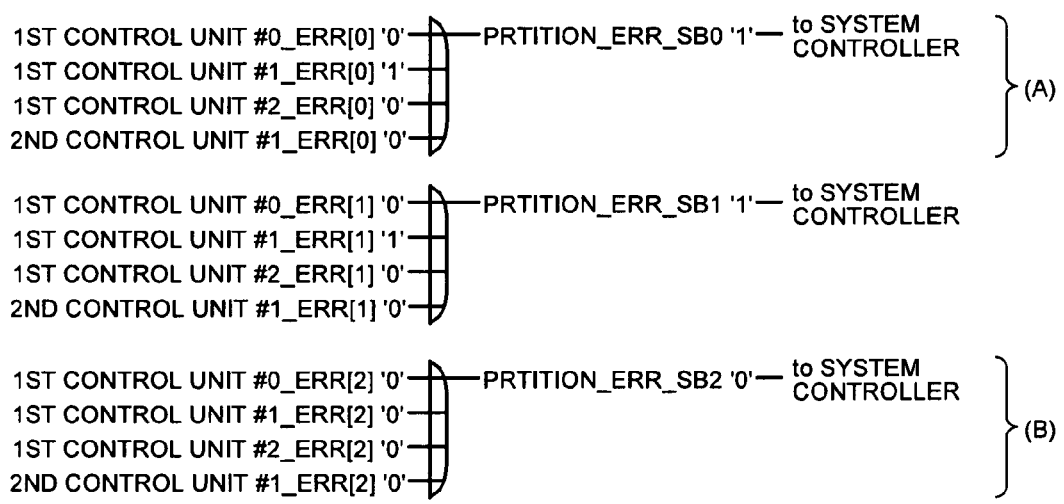
FIG. 17 is a diagram exemplifying the circuit configuration of the error report unit according to the first embodiment.

FIGS. 13 and 14 are diagrams illustrating processing by an enable signal generation unit according to the first embodiment. FIG. 15 is a diagram exemplifying a circuit configuration of the enable signal generation unit according to the first embodiment. FIGS. 16 and 17 are diagrams exemplifying the circuit configuration of an error report unit according to the first embodiment.

It is assumed that each component of the computer system 10 according to the first embodiment has a physical connection illustrated in FIG. 10. It is also assumed that partitions illustrated in FIG. 11 are built in the computer system 10 according to the first embodiment.

The first control unit 21 includes failure checkers that detect failures that occur in the first control unit 21 such as a bus parity checker and priority conflict checker.

The failure checkers of the first control unit 21 typically send an error signal containing applicability information indicating whether the error signal is valid and the ID of the first control unit 21 to the error report unit 25. A failure checker of the first control unit 21, for example, a failure checker of the first control unit 21 "#0" sends an error signal "control unit 1#0_ERR '1'".

Here, '1' indicates that the error signal is valid and '0' indicates that the error signal is invalid.

The second control unit 22 includes failure checkers that detect failures that occur in the second control unit 22 such as a bus checker.

The failure checkers of the second control unit 22 typically send an error signal containing applicability information indicating whether the error signal is valid and the ID of the second control unit 22 to the error report unit 25. For example, a failure checker of the second control unit 22 "#1" sends an error signal "control unit 2#1_ERR '1'".

As illustrated in FIG. 12, the partition ID register 23 and the partition ID register 41 store the partition ID (PID) and valid information (VAL) whether to send a re-drive command by associating with the ID of the system board 30 for each of the crossbar units 20.

The partition ID register 23 and the partition ID register 41 may store the ID of the crossbar unit 20 to which the system board 30 is connected by associating with the error signal of the system board 30.

The enable signal generation unit 24 typically sends an enable signal generated by using matching logic illustrated in FIG. 13 or 14 to the error report unit 25. The enable signal generation unit 24 also includes a circuit as illustrated in FIG. 15.

FIGS. 13 and 15 correspond to the enable signal generation unit 24 included in the crossbar unit 20 "#0" (hereinafter, denoted as the enable signal generation unit 24 "#0") and FIG. 14 corresponds to the enable signal generation unit 24 included in the crossbar unit 20 "#1".

A circuit obtained by replacing "SB0" by "SB3", "SB1" by "SB4", "SB2" by "SB5", "SB3" by "SB0", "SB4" by "SB1", and "SB5" by "SB3" in the circuit illustrated in FIG. 15 corresponds to the enable signal generation unit 24 "#1".

A description will be provided by taking a concrete example. The enable signal generation unit 24 "#0" determines whether partition information is the same by checking the ID of the partition to which the system board 30 belongs against IDs of partitions of all the system boards 30 mounted on the computer system 10 (see (A) in FIG. 13 and (A) in FIG. 15).

(A-1) in FIG. 13 means that a determination result "1" indicating that the partition "#1" of the system board 30 "SB0" and the partition "#1" of the system board 30 "SB0" are the same is obtained.

(A-2) in FIG. 13 means that a determination result "0" indicating that the partition "#0" of the system board 30 "SB0" and the partition "#2" of the system board 30 "SB2" are not the same is obtained.

Subsequently, based on the determination result, the enable signal generation unit 24 "#0" generates an enable signal to determine whether each of the system boards 30 connected to the crossbar unit 20 "#0" is under the control of the second control unit 22 included in the crossbar unit 20 "#0" (see (B) in FIG. 13 and (B) in FIG. 15).

(B-1) in FIG. 13 means that an enable signal "XB1_ERR_ENB[0] '0'" indicating that the system board 30 "SB0" is not under the control of the second control unit 22 "#1" included in the crossbar unit 20 "#0" is generated.

(B-2) in FIG. 13 means that an enable signal "XB1_ERR_ENB[2] '1'" indicating that the system board 30 "SB2" is under the control of the second control unit 22 included in the crossbar unit 20 "#0" is generated.

Subsequently, the enable signal generation unit 24 "#0" generates an enable signal to determine whether each of the system boards 30 connected to the crossbar unit 20 "#0" is under the control of the first control unit 21 included in the crossbar unit 20 "#0" based on the determination result and each generated enable signal (see (C) in FIG. 13 and (C) in FIG. 15).

(C-1) in FIG. 13 means that an enable signal "SB0_ERR_ENB[0] '1'" indicating that the system board 30 "SB0" is under the control of the first control unit 21 "#0" included in the crossbar unit 20 "#0" is generated.

(C-2) in FIG. 13 means that an enable signal "SB0_ERR_ENB[2] '0'" indicating that the system board 30 "SB0" is not under the control of the first control unit 21 "#2" included in the crossbar unit 20 "#0" is generated.

The error report unit 25 includes a circuit as illustrated in FIGS. 16 and 17. The error report unit 25 typically sends the ID of the system board 30 containing applicability information indicating whether the ID of the system board 30 is valid to the system controller 40.

Also, the error report unit 25 typically sends an error signal received from the failure checker of the first control unit 21 to the register update unit 44. Also, the error report unit 25 typically sends the ID of the second control unit 22 and the ID of the system board 30 containing applicability information indicating whether the ID of the system board 30 is valid to the system controller 40.

In FIGS. 16 and 17, it is assumed that the first control unit 21 "#1" included in the crossbar unit 20 "#0" has failed (see Failure 1 in FIG. 11).

A description will be provided by taking a concrete example. The error report unit 25 "#0" sends an error signal "control unit 1#0_ERR '1'" received from the failure checker of the first control unit 21 "#1" to the system controller 40.

The error report unit 25 "#0" checks an enable signal "SB0_ERR_ENB[0] '1'" generated by the enable signal generation unit 24 "#0" against the error signal "control unit 1#0_ERR '1'" (see (A) in FIG. 16).

Then, the error report unit 25 "#0" determines whether there is any signal containing applicability information "'1'" indicating being valid among signals obtained by checking (for example, "control unit 1#0_ERR[0] '1'").

Since there is a signal containing applicability information "'1'" indicating being valid, the error report unit 25 "#0" typically sends the ID ("PRTITION_ERR_SB0 '1'") of the system board 30 "SB0" containing applicability information indicating being valid to the system controller. 40 (see (A) in FIG. 17).

Also, the error report unit 25 "#0" checks an enable signal "XB1_ERR_ENB[0] '1'" generated by the enable signal generation unit 24 "#0" against the an error signal "control unit 2#1_ERR '1'" (see (B) in FIG. 16).

Then, the error report unit 25 "#0" sends each signal (for example, "control unit 2#1_ERR[0] '1'") obtained by checking to the system controller 40.

Then, the error report unit 25 "#0" determines whether there is any signal containing applicability information "'1'" indicating being valid among signals obtained by checking (for example, "control unit 2#1_ERR[2] '1'").

Since there is no signal containing applicability information "'1'" indicating being valid, the error report unit 25 "#0" typically sends the ID ("PRTITION_ERR_SB2 '0'") of the system board 30 "SB2" containing applicability information indicating being valid to the system controller 40 (see (B) in FIG. 17).

If, for example, the ID ("PRTITION_ERR_SB0 '1'") of the system board 30 "SB0" containing applicability information indicating being valid is received, the partition determination unit 42 recognizes a system board 30 "SB0" error contained in the error report.

Subsequently, the partition determination unit 42 acquires the ID of the partition "ID#1" corresponding to the system board 30 "SB0" from the partition ID register 41.

Then, the partition determination unit 42 determines the partition "ID#1" as the partition to which the system board 30 "SB0" belongs.

If, for example, the partition "ID#1" is determined, the stop command sending unit 43 acquires the system board 30 "SB0" and the system board 30 "SB1" corresponding to the ID of the partition "ID#1" from the partition ID register 41.

Then, the stop command sending unit 43 sends a stop command to each of the system board 30 "SB0" and the system board 30 "SB1".

If, for example, an error signal "control unit 1#1_ERR '1'" is received from the error report unit 25 "#1", the register update unit 44 registers valid information "1" with the partition ID register 41 by associating with the ID of the system board 30 "SB0" corresponding to the first control unit 21 "#1" included in the crossbar unit 20 "#1".

If, for example, "control unit 2#1_ERR[0] '1'" is received from the error report unit 25 "#1", the register update unit 44 extracts the system board 30 "SB0" contained in the signal and registers valid information "1" with the partition ID register 41 by associating with the system board 30 "SB0".

If, for example, the ID of the partition "ID#1" is acquired by the stop command sending unit 43, the re-drive command sending unit 45 determines whether valid information "1" is registered by associating with the system board 30 "SB0" and the system board 30 "SB1".

If the re-drive command sending unit 45 obtains a determination result that valid information "0" is not stored by associating with the system board 30 "SB0", the re-drive command sending unit 45 sends a re-drive command to the system board 30 "SB0".

Effects of First Embodiment

According to the computer system 10 of the first embodiment, as described above, if the first control unit 21 "#1" included in the crossbar unit 20 "#0" fails, driving of the system board 30 "SB0" and the system board 30 "SB1" can be stopped.

Also according to the computer system 10 of the first embodiment, driving of the system board 30 "SB0" can be restarted.

In this manner, according to the computer system 10 of the first embodiment, stuck-at control can be performed without causing the availability ratio of the computer system 10 to fall.

[b] Second Embodiment

In a second embodiment, the computer system 10 will be described by taking another concrete example. The second embodiment will be described in the order of the configuration of a computer system according to the second embodiment and effects of the second embodiment.

Configuration of a Computer System According to Second Embodiment

First, the configuration of a computer system according to the second embodiment will be described using FIGS. 18 to 28. Differences from the configuration of the computer system 10 according to the first embodiment will be described below.

Figure 18:
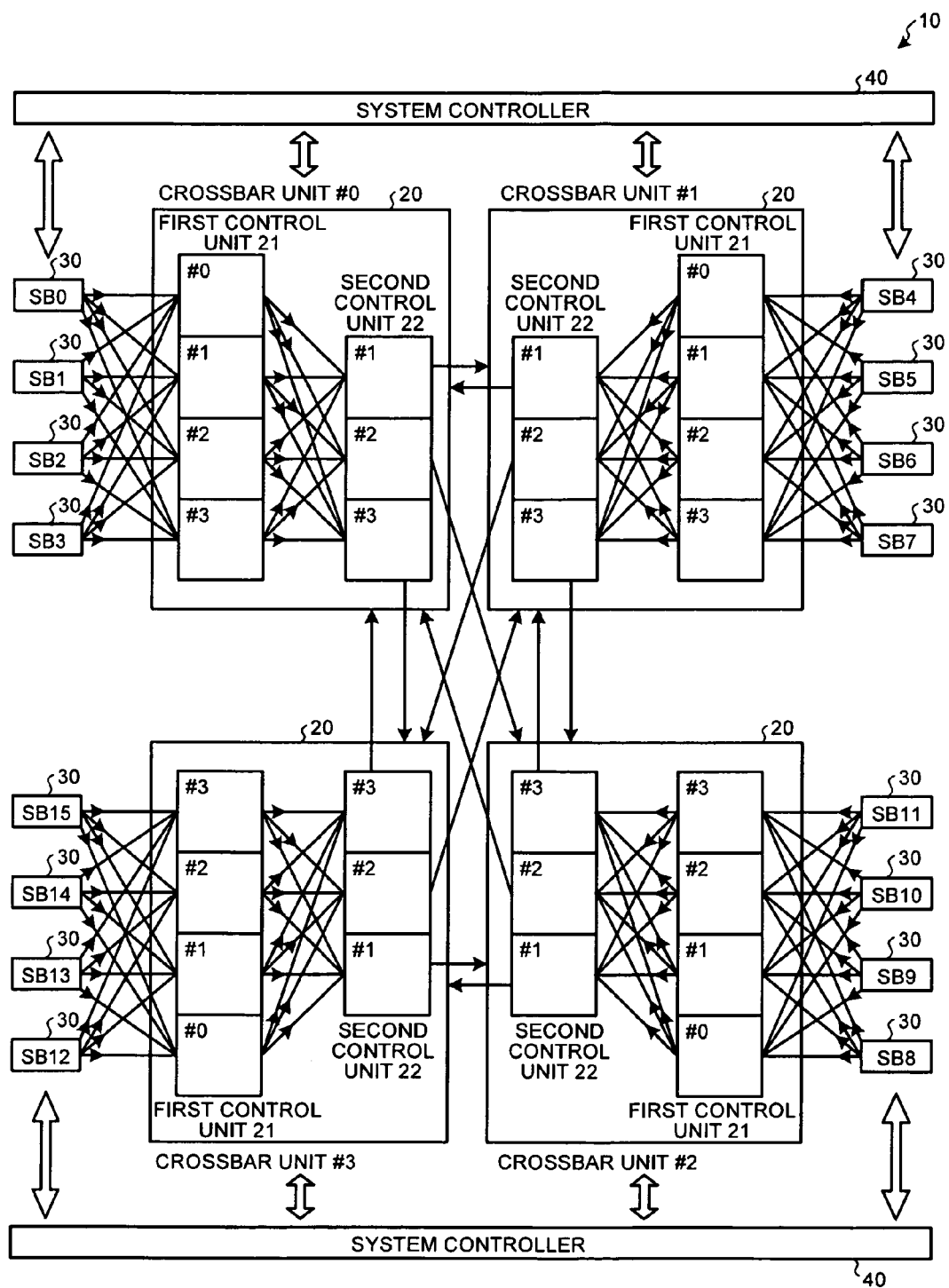
FIG. 18 is a diagram illustrating the physical connection of the computer system according to a second embodiment.
Figure 19:
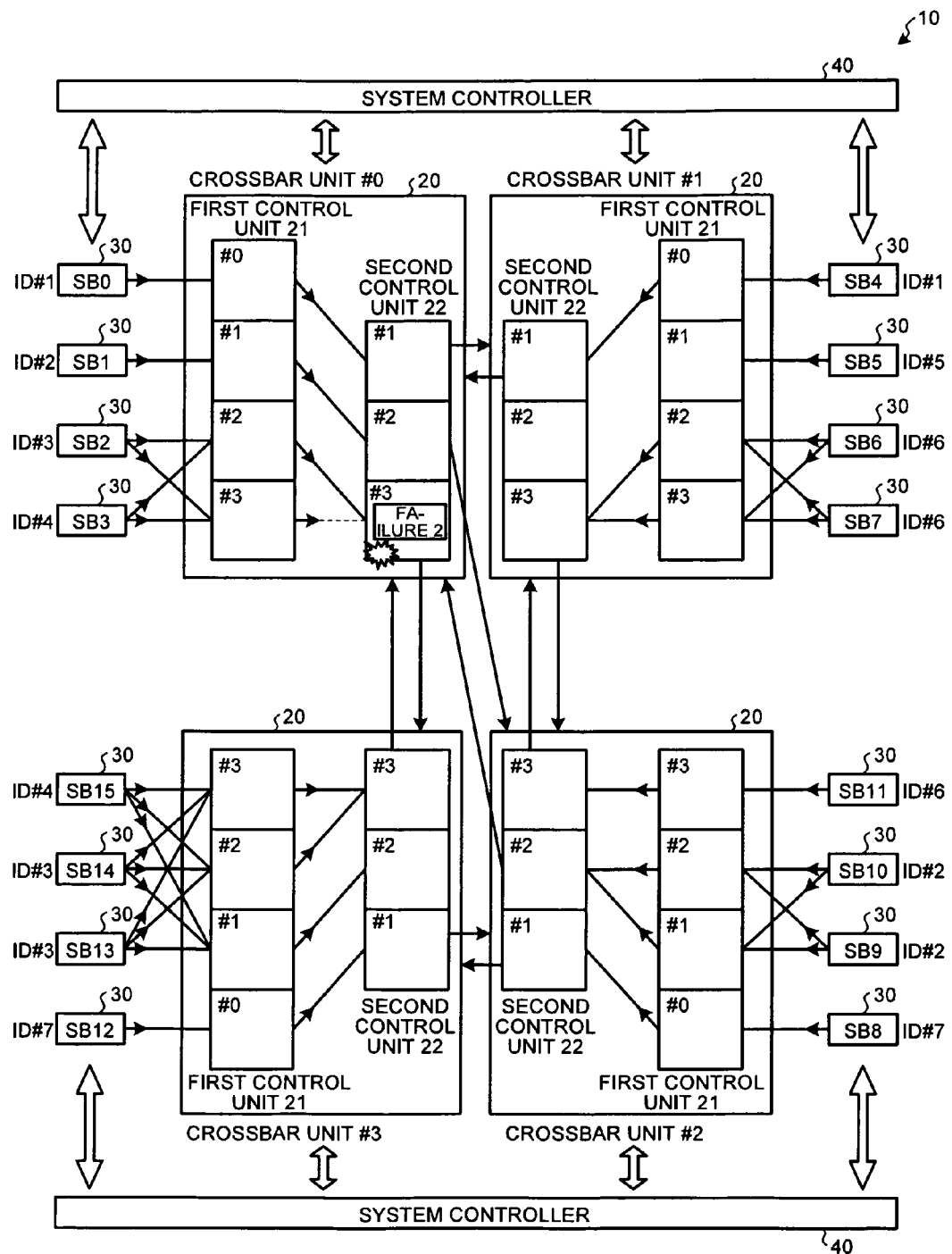
FIG. 19 is a diagram illustrating partitions built in the computer system according to the second embodiment.

FIG. 18 is a diagram illustrating the physical connection of a computer system according to the second embodiment. FIG. 19 is a diagram illustrating partitions built in the computer system according to the second embodiment. FIG. 20 is a diagram exemplifying information stored in the partition ID register according to the second, embodiment.

Figure 26:
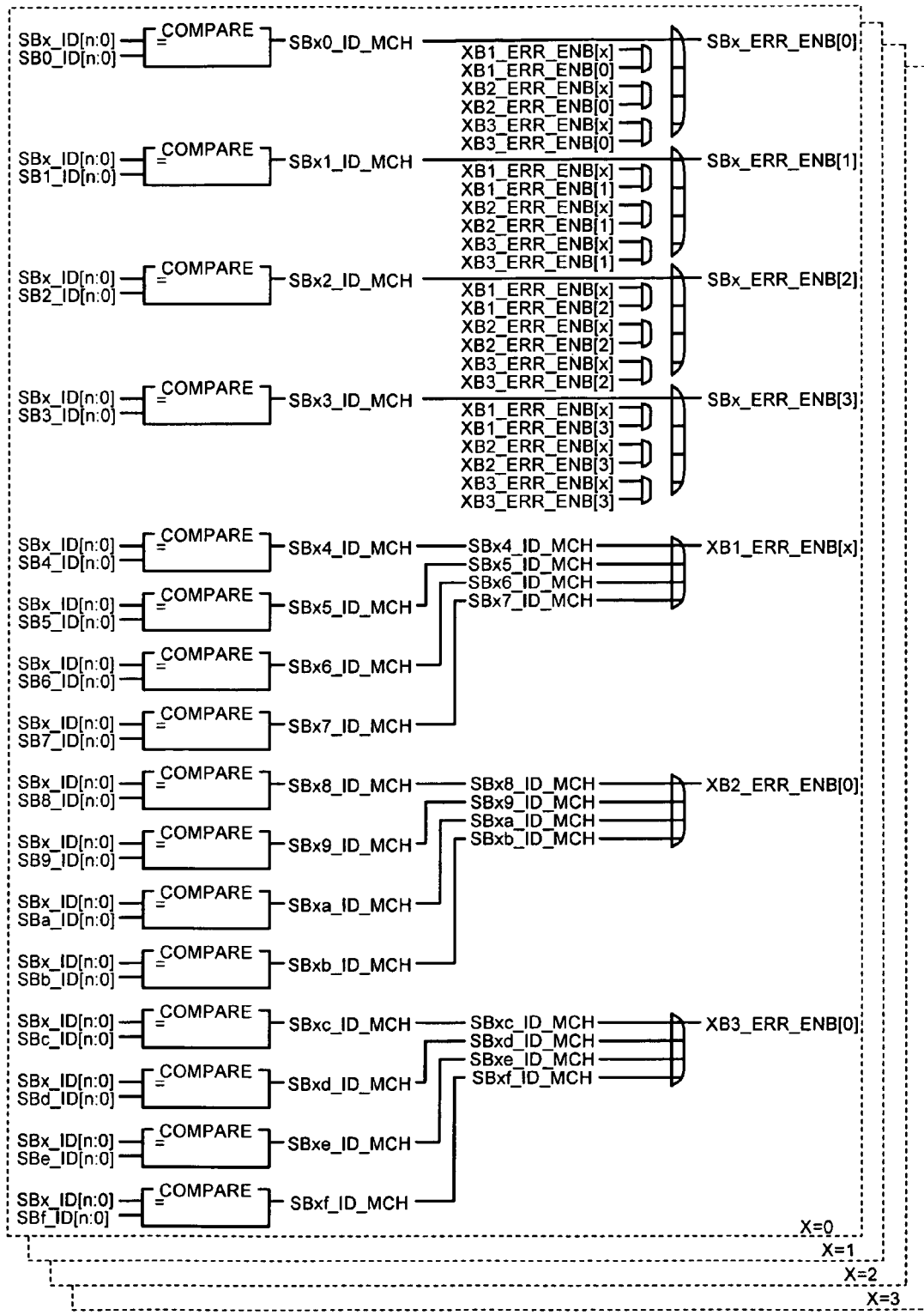
FIG. 26 is a diagram exemplifying the circuit configuration of the enable signal generation unit according to the second embodiment.
Figure 27:
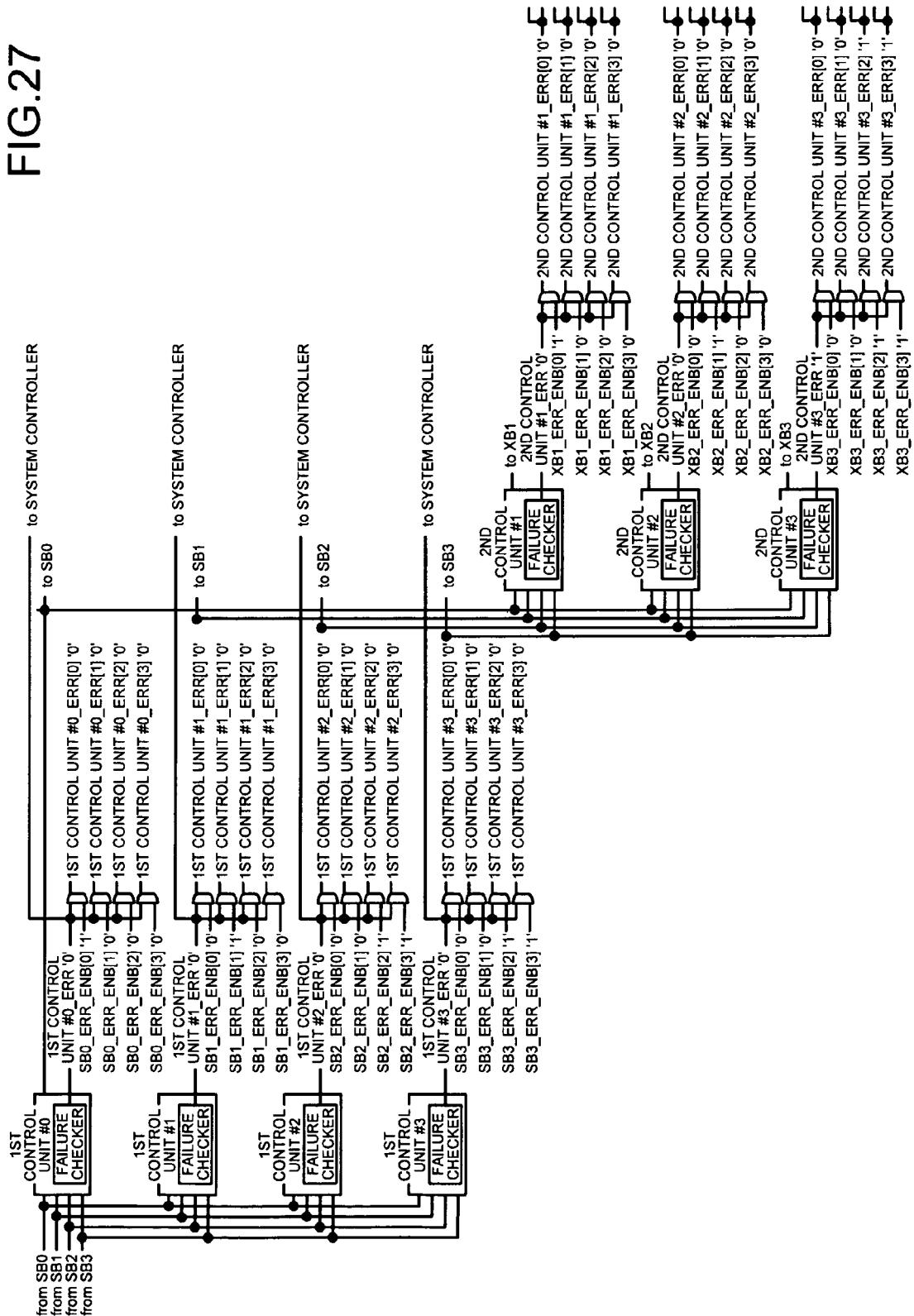
FIG. 27 is a diagram exemplifying the circuit configuration of the error report unit according to the second embodiment.
Figure 28:
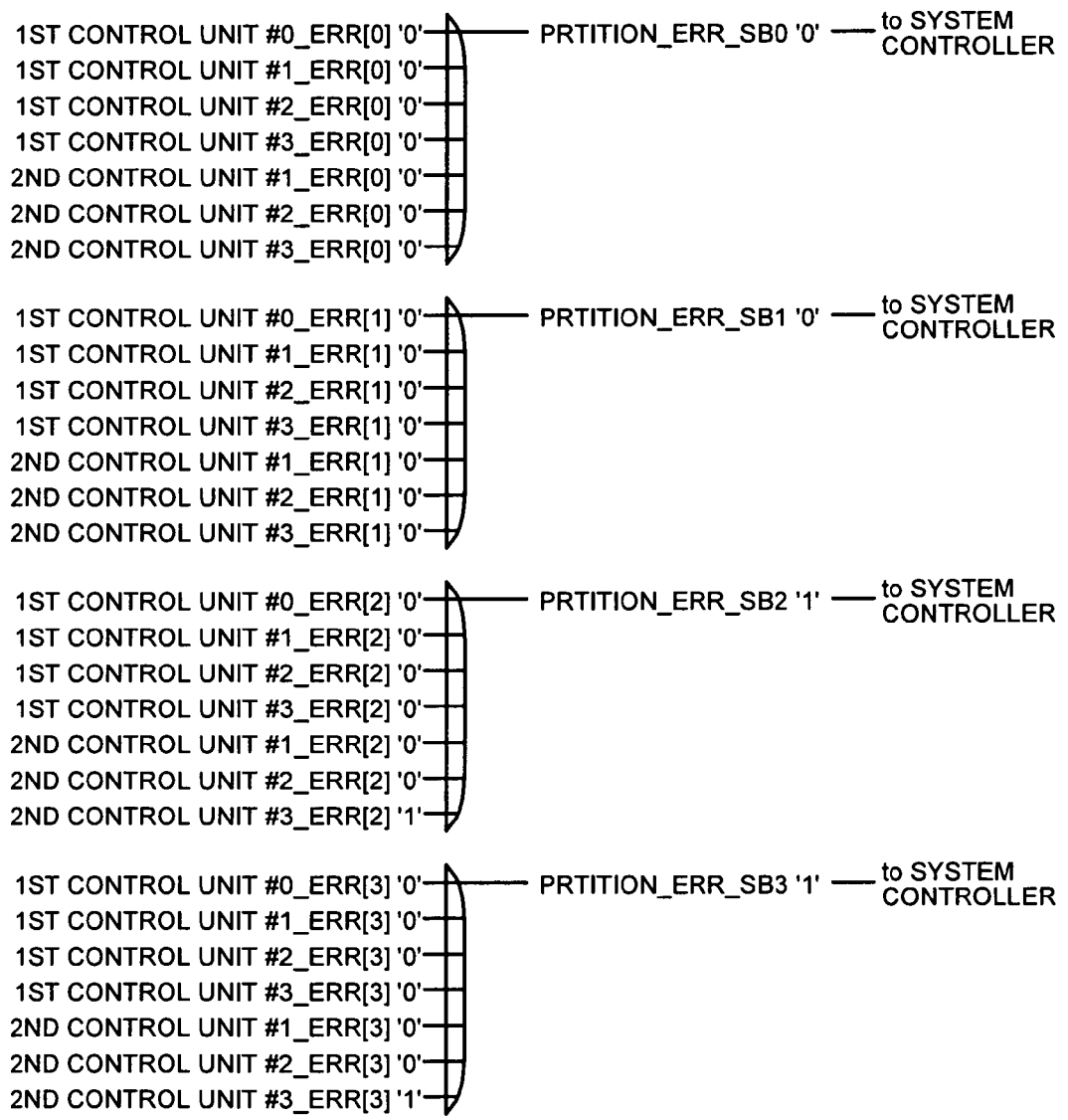
FIG. 28 is a diagram exemplifying the circuit configuration of the error report unit according to the second embodiment.

FIGS. 21 to 25 are diagrams illustrating processing by the enable signal generation unit according to the second embodiment. FIG. 26 is a diagram exemplifying the circuit configuration of the enable signal generation unit according to the second embodiment. FIGS. 27 and 28 are diagrams exemplifying the circuit configuration of the error report unit according to the second embodiment.

It is assumed that each component of the computer system 10 according to the second embodiment has a physical connection illustrated in FIG. 18. It is also assumed that partitions illustrated in FIG. 19 are built in the computer system 10 according to the second embodiment.

The partition ID register 23 and the partition ID register 41 store the ID of the system board 30, partition ID (PID), and valid information (VAL) as illustrated in FIG. 20.

The enable signal generation unit 24 typically sends an enable signal generated by using matching logic illustrated in FIGS. 21 to 25 to the error report unit 25. The enable signal generation unit 24 also includes a circuit as illustrated in FIG. 26.

FIGS. 21, 22, and 26 correspond to the enable signal generation unit 24 "#0", FIG. 23 to the enable signal generation unit 24 "#1", FIG. 24 to the enable signal generation unit 24 "#2", and FIG. 25 to the enable signal generation unit 24 "#3". Matching logic or circuits illustrated in FIGS. 22 to 26 are partially omitted for convenience of description.

"SBa" in FIGS. 21 to 26 corresponds to "SB10", "SBb" to "SB11", "SBc" to "SB12", "SBd" to "SB13", "SBe" to "SB14", and "SBf" to "SB15".

The error report unit 25 includes a circuit a illustrated in FIGS. 27 and 28. FIGS. 27 and 28 assume that the second control unit 22 "#3" included in the crossbar unit 20 "#0" has failed (see "Failure 2" in FIG. 19).

Effects of Second Embodiment

According to the computer system 10 of the second embodiment, if the second control unit 22 "#3" included in the crossbar unit 20 "#0" fails, driving of the system board 30 "SB2", system board 30 "SB3", system board 30 "SB13", system board 30 "SB14", and system board 30 "SB15" can be stopped.

Also according to the computer system 10 of the second embodiment, driving of the system board 30 "SB13", system board 30 "SB14", and system board 30 "SB15" can be restarted.

In this manner, according to the computer system 10 of the second embodiment, stuck-at control can be performed without causing the availability ratio of the computer system 10 to fall.

[c] Third Embodiment

In addition to the above embodiments of the present data processing system, data processing method, and data processing program, various different embodiments may be carried out. Thus, another embodiment will be described as a third embodiment.

For example, the computer system 10 may stop driving of control units related to a failed control unit.

More specifically, if Failure 1 occurs (see FIG. 11), the computer system 10 according to the first embodiment may stop driving of the first control unit 21 "#0" and the first control unit 21 "#1" included in the crossbar unit 20 "#0".

If Failure 2 occurs (see FIG. 19), the computer system 10 according to the first embodiment may stop driving of the first control unit 21 "#2", the first control unit 21 "#3", and the second control unit 22 "#3" included in the crossbar unit 20 "#0" and the first control unit 21 "#1", the first control unit 21 "#2", and the first control unit 21 "#3" included in the crossbar unit 20 "#3".

Information (for example, storage information illustrated in FIGS. 4, 12, and 20) including processing procedures, control procedures, concrete names, and various kinds of data and parameters illustrated in the above document and drawings may be changed optionally if not specifically mentioned.

Each component of each illustrated device is functionally conceptual and need not necessarily be configured physically as illustrated. That is, concrete forms of distribution/integration of each device is not limited to the illustrated forms and all or a portion thereof may be reconfigured by functional or physical distribution/integration in any unit according to various loads or usage. For example, the partition determination unit 42 and the stop command sending unit 43 illustrated in FIG. 3 may be configured by integration thereof.

Further, all or a portion of each processing function executed by each device can be realized by a CPU and a program parsed and executed by the CPU.

Figure 29:
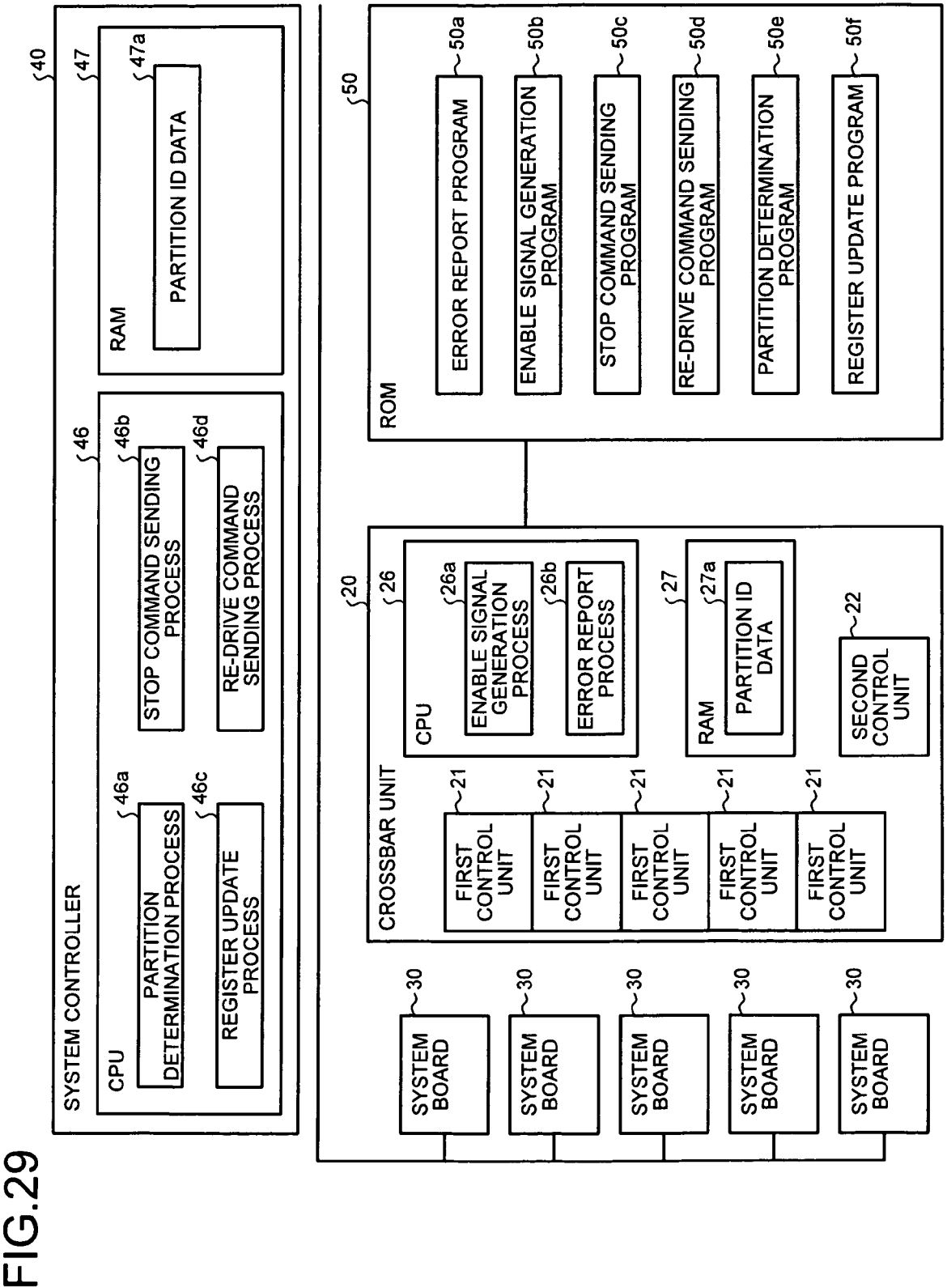
FIG. 29 is a diagram illustrating a computer executing a data processing program.

The present embodiment may be realized by executing a prepared program by the computer system 10. Thus, a computer that executes an error handling program having the function similar to that of the computer system 10 illustrated in the above embodiments is taken as an example for the description below by using FIG. 29. FIG. 29 is a diagram illustrating a computer executing an error handling program.

As illustrated in FIG. 29, the computer system 10 particularly includes a ROM 50, the crossbar unit 20 particularly includes a CPU 26 and a RAM 27, and the system controller 40 particularly includes a CPU 46 and a RAM 47.

The ROM 50 stores in advance a data processing program that carries out the same function as that of the computer system 10 illustrated in the first embodiment, that is, as illustrated in FIG. 29, an error report program 50a, an enable signal generation program 50b, a stop command sending program 50c, a re-drive command sending program 50d, a partition determination program 50e, and a register update program 50f. Like each component of the computer system 10 illustrated in FIG. 3, these programs 50a to 50f may be integrated or distributed when necessary.

The CPU 26 reads the error report program 50a and the enable signal generation program 50b from the ROM 50 for execution and the CPU 46 reads the stop command sending program 50c, the re-drive command sending program 50d, the partition determination program 50e, and the register update program 50f from the ROM 50 for execution.

As illustrated in FIG. 29, the computer system 10 causes the programs 50a to 50f to function as an enable signal generation process 26b, an error report program process 26a, a stop command sending program 26c, a re-drive command sending program 26d, a partition determination program 26e, and a register update program 26f. The processes 26a to 26f correspond to the enable signal generation unit 24, the error report unit 25, the partition determination unit 42, the stop command sending unit 43, the register update unit 44, the re-drive command sending unit 45 illustrated in FIG. 3, respectively.

The CPU 26 performs processing based on partition ID data 27a stored in the RAM 27 and the CPU 46 performs processing based on partition ID data 47a stored in the RAM 47.

The partition ID data 27a corresponds to the partition ID register 23 illustrated in FIG. 3 and the partition ID data 47a corresponds to the partition ID register 41 illustrated in FIG. 3.

Each of the above programs 50a to 50f need not necessarily be caused to store in the ROM 50 from the beginning and, for example, may be caused to store in a "portable physical medium" inserted into the computer system 10 such as a flexible disk (FD), CD-ROM, DVD disk, magneto-optical disk, and IC card, a "fixed physical medium" provided inside or outside the computer system 10 such as an HDD, and further "another computer (or server)" connected to the computer system 10 via a public network, the Internet, LAN, and WAN so that the computer system 10 can read each program therefrom to execute the program.

The data processing method described in the present embodiment may also be realizable by executing a program prepared in advance on a computer such as a personal computer and workstation. The program can be distributed via a network such as the Internet. The program may also be recorded in a computer readable recording medium such as a hard disk, flexible disk (FD), CD-ROM, MO, and DVD so that the program is read from the recording medium by the computer for execution.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control system for driving a data processing apparatus, the system comprising:

data processing apparatuses that process data;

a data transfer apparatus that include control units to control communication between the data processing apparatuses and include a processing apparatus information sending unit that sends, when the control unit fails, a piece of processing apparatus information corresponding to the data processing apparatus under control of the failed control unit from among pieces of processing apparatus information uniquely attached respectively to the data processing apparatuses to a system control apparatus; and the system control apparatus that includes a stop command sending unit that determines to which of partitions that logically divide the system the data processing apparatus corresponding to the piece of processing apparatus information received from the data transfer apparatus belongs, the stop command sending unit sending a stop command to stop driving of the data processing apparatus belonging to the determined partition, wherein the control unit performs priority control of communication between the data transfer apparatus and each of the data processing apparatuses, and performs priority control of communication between the data transfer apparatuses, wherein the control unit includes first control units and a second control unit, the first control units control communication between each data processing apparatus connected to the data transfer apparatus and the data transfer apparatus, and the second control unit is connected to the first control units to control communication with data transfer apparatuses other than the data transfer apparatuses, wherein the data transfer apparatus further includes an error report unit that typically sends an error signal received from a failure checker of the first control units to a register update unit and that typically sends the ID of the second control unit and the ID of the data processing apparatus containing applicability information indicating whether the ID of the data processing apparatus is valid to a system control apparatus.

2. A control system for driving a data processing apparatus, the system comprising:

data processing apparatuses that process data;

a data transfer apparatus that include control units to control communication between the data processing apparatuses and include a processing apparatus information sending unit that sends, when the control unit fails, a piece of processing apparatus information corresponding to the data processing apparatus under control of the failed control unit from among pieces of processing apparatus information uniquely attached respectively to the data processing apparatuses to a system control apparatus; and the system control apparatus that includes a stop command sending unit that determines to which of partitions that logically divide the system the data processing apparatus corresponding to the piece of processing apparatus information received from the data transfer apparatus belongs, the stop command sending unit sending a stop command to stop driving of the data processing apparatus belonging to the determined partition, wherein the control unit performs priority control of communication between the data transfer apparatus and each of the data processing apparatuses, and performs priority control of communication between the data transfer apparatuses, wherein the control unit includes first control units and a second control unit, the first control units control communication between each data processing apparatus connected to the data transfer apparatus and the data transfer apparatus, and the second control unit is connected to the first control units to control communication with data transfer apparatuses other than the data transfer apparatuses, wherein the control unit includes a first control unit and a second control unit, the first control unit includes failure checkers that detect a bus parity failure and a priority conflict failure that occur in the first control unit, the failure checkers of the first control unit typically send an error signal containing applicability information indicating whether the error signal is valid and the ID of the first control unit to an error report unit, a failure checker of the first control unit "#0" sends the error signal "control unit 1#0_ERR '1'", '1' indicates that the error signal is valid and '0' indicates that the error signal is invalid, the second control unit includes bus checkers that detect failures that occur in the second control unit, the failure checkers of the second control unit typically send an error signal containing applicability information indicating whether the error signal is valid and the ID of the second control unit to the error report unit, and a failure checker of the second control unit "#1" sends the error signal "control unit 2#1_ERR '1'".

3. A control system for driving a data processing apparatus, the system comprising:

data processing apparatuses that process data;

a data transfer apparatus that include control units to control communication between the data processing apparatuses and include a processing apparatus information sending unit that sends, when the control unit fails, a piece of processing apparatus information corresponding to the data processing apparatus under control of the failed control unit from among pieces of processing apparatus information uniquely attached respectively to the data processing apparatuses to a system control apparatus; and the system control apparatus that includes a stop command sending unit that determines to which of partitions that logically divide the system the data processing apparatus corresponding to the piece of processing apparatus information received from the data transfer apparatus belongs, the stop command sending unit sending a stop command to stop driving of the data processing apparatus belonging to the determined partition, wherein the control unit performs priority control of communication between the data transfer apparatus and each of the data processing apparatuses, and performs priority control of communication between the data transfer apparatuses, wherein the control unit includes first control units and a second control unit, the first control units control communication between each data processing apparatus connected to the data transfer apparatus and the data transfer apparatus, and the second control unit is connected to the first control units to control communication with data transfer apparatuses other than the data transfer apparatuses, wherein the system control apparatus further includes a re-drive command sending unit that sends a re-drive command to restart driving of the data processing apparatus excluding the data processing apparatus that corresponds to the failed control unit and is thus stuck from the data processing apparatuses corresponding respectively to the pieces of processing apparatus information acquired by the stop command sending unit, wherein the system control apparatus further includes a register update unit that registers, if an error signal sent from the first control unit is received, sending disapproval information with a partition ID register by associating with the data processing apparatus to which a re-drive command is not to be sent and that registers, if an error signal of the data processing apparatus of the second control unit is received, sending disapproval information with the partition ID register by associating with the error signal of the data processing apparatus and that causes the partition ID register to update by generating copy information by copying IDs of partitions stored in the partition ID register.

* * * * *